(12) United States Patent
Nguyen et al.

(10) Patent No.: US 12,545,288 B2
(45) Date of Patent: Feb. 10, 2026

(54) DEPOT BEHAVIORS FOR AUTONOMOUS VEHICLES

(71) Applicant: WAYMO LLC, Mountain View, CA (US)

(72) Inventors: Son-Ca Nguyen, Mountain View, CA (US); Craig Robinson, Santa Clara, CA (US); Jakob Robert Zwiener, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 189 days.

(21) Appl. No.: 18/466,061

(22) Filed: Sep. 13, 2023

(65) Prior Publication Data

US 2025/0083695 A1   Mar. 13, 2025

(51) Int. Cl.
   *B60W 60/00*      (2020.01)
   *B60W 50/14*      (2020.01)
(52) U.S. Cl.
   CPC .......... *B60W 60/001* (2020.02); *B60W 50/14* (2013.01); *B60W 2050/146* (2013.01); *B60W 2556/45* (2020.02)
(58) Field of Classification Search
   None
   See application file for complete search history.

(56) References Cited

U.S. PATENT DOCUMENTS

| 12,128,878 B1* | 10/2024 | Funke | G08G 1/146 |
| 2019/0205842 A1 | 7/2019 | Starns | |
| 2020/0126417 A1 | 4/2020 | Selvam et al. | |
| 2020/0320881 A1 | 10/2020 | Woodrow et al. | |
| 2020/0356098 A1 | 11/2020 | Nix et al. | |
| 2021/0081908 A1 | 3/2021 | Derouen | |
| 2022/0004200 A1 | 1/2022 | Colijn et al. | |
| 2022/0075072 A1* | 3/2022 | Chung | B60W 50/029 |
| 2024/0220937 A1* | 7/2024 | Yu | G06F 8/65 |

OTHER PUBLICATIONS

The Extended European Search Report for European Patent Application No. 24198012.7, Jan. 27, 2025, 6 Pages.

* cited by examiner

*Primary Examiner* — Donald J Wallace
*Assistant Examiner* — Paysun Wu
(74) *Attorney, Agent, or Firm* — Botos Churchill IP Law LLP

(57) ABSTRACT

Aspects of the disclosure provide for depot behaviors for autonomous vehicles. For instance, a signal to control an autonomous vehicle to a depot area may be received from a server computing device. A prioritized list of staging areas within the depot area may be identified. Each staging area of the prioritized list of staging areas enables the vehicle to observe stopping locations at which a need of the vehicle may be addressed. The vehicle may be controlled to a first staging area of the prioritized list. Once the vehicle has reached the first staging area, whether a stopping location that meets one or more needs of the vehicle is available may be determined. When is available, the vehicle may be controlled to the available stopping location. When not available, the vehicle may be controlled to a second staging area of the prioritized list.

20 Claims, 27 Drawing Sheets

DEPOT BEHAVIORS FOR AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the autonomous vehicle's surroundings. This data may be combined with pre-stored map information in order to enable the autonomous vehicle to plan trajectories in order to maneuver itself through the surroundings.

BRIEF SUMMARY

One aspect of the disclosure provides a method. The method includes receiving, by one or more processors, from a server computing device, a signal to control an autonomous vehicle to a depot area; identifying, by the one or more processors, a prioritized list of staging areas within the depot area, wherein each staging area of the prioritized list of staging areas enables the autonomous vehicle to observe stopping locations at which a need of the autonomous vehicle may be addressed; controlling, by the one or more processors, the autonomous vehicle to a first staging area of the prioritized list of staging areas; once the autonomous vehicle has reached the first staging area, determining whether a stopping location that meets one or more needs of the autonomous vehicle is available; when a stopping location that meets the one or more needs is available, controlling, by the one or more processors, the autonomous vehicle to the available stopping location; and when a stopping location that meets the one or more needs is not available, controlling, by the one or more processors, the autonomous vehicle to a second staging area of the prioritized list of staging areas.

In one example, wherein identifying the prioritized list of staging areas includes identifying the prioritized list of staging areas from a plurality of prioritized lists of staging areas based on the one or more needs. In another example, the prioritized list of staging areas is received from the server computing device. In another example, determining whether a stopping location that meets one or more needs of the autonomous vehicle is available, includes attempting to observe stopping locations proximate to the first staging area using one or more sensors of a perception system. In another example, the one or more needs includes charging. In another example, the one or more needs includes sensor cleaning. In another example, the one or more needs includes internal or external cleaning. In another example, the method also includes, once the autonomous vehicle has reached the second staging area, determining whether a second stopping location is available for the autonomous vehicle, the second stopping location corresponding to a location where the one or more needs of the autonomous vehicle can be met. In another example, the method also includes, based on the determination of whether the second stopping location is available for the autonomous vehicle, identifying a third staging area of the prioritized list of stopping locations; and controlling, by the one or more processors, the autonomous vehicle to the third staging area. In another example, the method also includes, once the autonomous vehicle has reached the second staging area, determining that a second stopping location is available for the autonomous vehicle; and based on the determination that the second stopping location is available for the autonomous vehicle, controlling the autonomous vehicle to the second stopping location. In this example, the method also includes, displaying, on a display of the autonomous vehicle, a notification identifying the one or more needs. In addition, the notification provides an instruction for a human operator to enable the autonomous vehicle to have the one or more needs to address.

Another aspect of the disclosure provides a system comprising one or more processors. The one or more processors are configured to: receive, from a server computing device, a signal to control an autonomous vehicle to a depot area; identify a prioritized list of staging areas within the depot area, wherein each staging area of the prioritized list of staging areas enables the autonomous vehicle to observe stopping locations at which a need of the autonomous vehicle may be addressed; control the autonomous vehicle to a first staging area of the prioritized list of staging areas; once the autonomous vehicle has reached the first staging area, determining whether a stopping location that meets one or more needs of the autonomous vehicle is available; when a stopping location that meets the one or more needs is available, control the autonomous vehicle to the available stopping location; and when a stopping location that meets the one or more needs is not available, control the autonomous vehicle to a second staging area of the prioritized list of staging areas.

In one example, the one or more processors are further configured to identify the prioritized list of staging areas by identifying the prioritized list of staging areas from a plurality of prioritized lists of staging areas based on the one or more needs. In another example, the prioritized list of staging areas is received from the server computing devices. In another example, the one or more processors are further configured to, once the autonomous vehicle has reached the second staging area, determine whether a second stopping location is available for the autonomous vehicle, the second stopping location corresponding to a location where the one or more needs of the autonomous vehicle can be met. In this example, the one or more processors are further configured to: based on the determination of whether the second stopping location is available for the autonomous vehicle, identify a third staging area of the prioritized list of stopping locations; and control the autonomous vehicle to the third staging area. In another example, the one or more processors are further configured to: once the autonomous vehicle has reached the second staging area, determine that a second stopping location is available for the autonomous vehicle; based on the determination that the second stopping location is available for the autonomous vehicle, control the autonomous vehicle to the second stopping location. In another example, the one or more processors are further configured to display, on a display of the autonomous vehicle, a notification identifying the one or more needs. In another example, the system also includes the autonomous vehicle.

DETAILED DESCRIPTION

Overview

Figure 1:
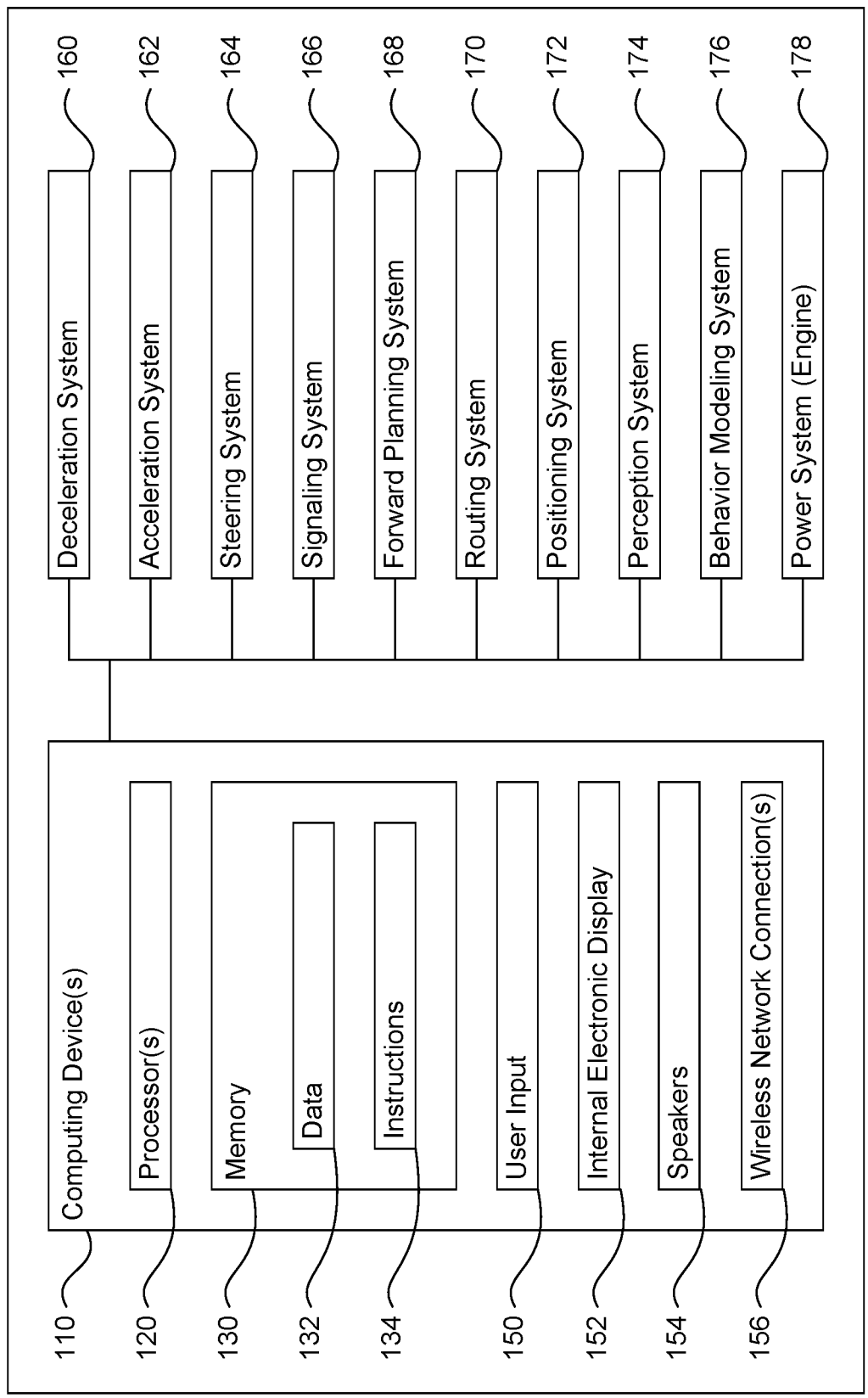
FIG. 1 is a functional diagram of an example vehicle in accordance with an exemplary embodiment.

The technology relates to providing transportation services using a fleet of autonomous vehicles, and in particular depot behaviors for autonomous vehicles when within a depot area. In this regard, a depot area may be a "home base" for all or a portion of a fleet of autonomous vehicles. Such locations may allow for autonomous vehicles to charge or refuel, swap hardware (e.g., a memory device), receive software updates, cleaning and other maintenance services, park for extended periods, etc. between trips.

In many instances, it may be a simple task for a human driver to identify an available stopping location (e.g., stopping location) with some feature that the autonomous vehicle needs (e.g., charging capabilities). For example, a human driver may be able to drive slowly, look for signs that other drivers are ready to pull away, and proceed accordingly. For an autonomous vehicle, such behaviors are fairly complex to achieve and computationally very expensive. Moreover, using a back end server computing device to manage behavior inside of a depot area can create other issues. For instance, monitoring exactly what stopping locations in a depot are available can be challenging and sending an autonomous vehicle to a specific stopping location can result in the autonomous vehicle becoming stuck if there is an obstacle in the way of reaching the stopping location or the stopping is not actually available for some reason (e.g., there is another vehicle stopped there or some object, such as a human, stopping the autonomous vehicle from entering the stopping location. Such situations may require a human operator to enter the autonomous vehicle, change modes (e.g., from autonomous to manual, which may require a human operator to achieve), and control the autonomous vehicle to an appropriate location. In addition, this may increase the necessary number of available human operators at a depot area in order to keep the transportation service running efficiently. Thus, enabling an autonomous vehicle to navigate through a depot area efficiently is a critical function for a fleet of autonomous vehicles and may even limit the scale of a service.

As an autonomous vehicle of the fleet drives around, its various internal systems may monitor the autonomous vehicle's status. This status information may be reported to a "backend" server computing device of the transportation system. In some instances, this may include whether the autonomous vehicle is currently servicing a trip, charge or fuel status, whether the autonomous vehicle needs sensors cleaned, memory capacity for a memory device, tire pressure, etc.

Based on this status information, the server computing device may determine that the autonomous vehicle must proceed to a depot area to have one or more needs addressed. In response, the server computing devices may identify a closest depot area to the autonomous vehicle and/or a depot area that is capable of addressing the one or more needs. The server computing devices may send a signal to the autonomous vehicle directing the autonomous vehicle to travel to the identified depot area. The autonomous vehicle may automatically proceed to the identified depot area or may complete another task first.

The autonomous vehicle may receive the signal and identify a prioritized list of staging areas within the identified depot area. For instance a plurality of prioritized lists of staging areas may be predefined. A staging area may be defined as a specific point or a two-dimensional or three-dimensional area. Each of the staging areas may allow the autonomous vehicle to determine whether there is a stopping location available. The staging area may enable the autonomous vehicle to identify whether there is a stopping location (for instance, a parking spot) available.

Each of these prioritized lists may be associated with various sets of potential needs. In this regard, each staging area may enable an autonomous vehicle to observe stopping locations within a depot area which have some amenity that may enable the autonomous vehicle to have the potential needs associated with that staging area addressed. Based on one or more needs, an associated prioritized list of staging areas may be identified. Each prioritized list of staging areas and associated set of potential needs may be manually selected by human operators based on the available services and configurations of each depot area. However, in some instances, the prioritized list of staging areas may be updated in real time based on the status of a depot area.

In some instances, the prioritized list of staging areas and sets of potential needs may be stored in a relationship table or other storage arrangement in local memory of the autonomous vehicle. In addition or alternatively, the prioritized list of staging areas and sets of potential needs may be stored in a remote storage system. For instance, the server computing devices may access the remote storage system and identify a prioritized list of staging areas. In such instances, the server computing devices may send the prioritized list of staging areas to the autonomous vehicle with the signal identifying the depot area, when the autonomous vehicle is within some predetermined distance of the depot area, or when the autonomous vehicle arrives at the depot area.

The autonomous vehicle may then set a first staging area of the prioritized list of staging areas as a destination for the autonomous vehicle and control itself to the first staging area. When at the first staging area, if the autonomous vehicle identifies an available stopping location, the autonomous vehicle may control itself to that stopping location and stop.

When at the first staging area, if the autonomous vehicle determines that there are no stopping locations available, the autonomous vehicle will identify a second staging area of the prioritized list of staging areas. The autonomous vehicle may then set the second staging area of the prioritized list of staging areas as a destination for the autonomous vehicle and control itself to the second staging area. When at the second staging area, if the autonomous vehicle identifies an available stopping location, the autonomous vehicle may control itself to that stopping location and stop. When at the second staging area, if the autonomous vehicle determines that there are no stopping locations available, the autonomous vehicle will identify a third staging area of the prioritized list of staging areas. The autonomous vehicle may then set the third staging area of the prioritized list of staging areas as a destination for the autonomous vehicle and control itself to the third staging area to look for an available stopping location.

This process may continue until the autonomous vehicle finds a stopping location or until the autonomous vehicle reaches the last staging area of the prioritized list. This last staging area may simply be a general parking area for vehicles. After some period of time, the autonomous vehicle may identify a new prioritized list of staging areas or proceed back to the first staging area to begin the process anew.

Once an autonomous vehicle is at a stopping location, one or more needs may be addressed. In some instances, in order to better enable the human operator to address the one or more needs as quickly as possible, the autonomous vehicle may include an external display device that displays a notification that identifies the one or more needs. Such notifications may also be displayed on internal and displays.

Once a need has been addressed, the autonomous vehicle may determine whether there still one or more needs to be addressed. Based on this, the autonomous vehicle may identify a new prioritized list of staging areas. At some point, when there are no further needs to be addressed, the autonomous vehicle may then proceed to some other destination identified by the server computing devices.

The features described herein may enable autonomous vehicles to achieve certain driving behaviors within a depot area. In many instances, the features described herein may prevent an autonomous vehicle from becoming stuck if there is an obstacle in the way of reaching a particular stopping location in order to address some need of the autonomous vehicle or the stopping is not actually available for some reason (e.g., there is another vehicle stopped there or some object, such as a human, stopping the autonomous vehicle from entering the stopping location). This is because the autonomous vehicle is provided with more flexibility to address such situations. This, in turn, may reduce the need for human operators who might otherwise be needed to enter the autonomous vehicle, change modes (e.g., from autonomous to manual), and control the autonomous vehicle to an appropriate location. In some instances, the features described herein may result in the autonomous vehicles driving to where the autonomous vehicle's needs are most likely to be met (e.g., where certain amenities or human operators are available to address such needs). This may also reduce how much the human operators will have to move around in the depot, further saving resources and time. As such, the features described herein may reduce the need for human operators to be involved in the processes at depot areas and thus may reduce the workforce needed and overall operational costs to run a transportation service efficiently.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the autonomous vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the autonomous vehicle assists with one or more driving operations (e.g., steering, braking and/or accelerating to perform lane centering, adaptive cruise control or emergency braking), the human driver is expected to be situationally aware of the autonomous vehicle's surroundings and supervise the assisted driving operations. Here, even though the autonomous vehicle may perform all driving tasks in certain situations, the human driver is expected to be responsible for taking control as needed.

In contrast, in a fully autonomous driving mode, the control system of the autonomous vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the autonomous vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The autonomous vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the autonomous vehicle in order to control the autonomous vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the autonomous vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the autonomous vehicle. Computing devices 110 may also use the signaling system 166 in order to signal the autonomous vehicle's intent to other drivers or vehicles, for example, by lighting turn signals or brake lights when needed.

Routing system 170 may be used by computing devices 110 in order to generate a route to a destination using map information. Planning system 168 may be used by computing device 110 in order to generate short-term trajectories that allow the autonomous vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2A:
FIGS. 2A-2B are examples of map information in accordance with aspects of the disclosure.
Figure 2B:
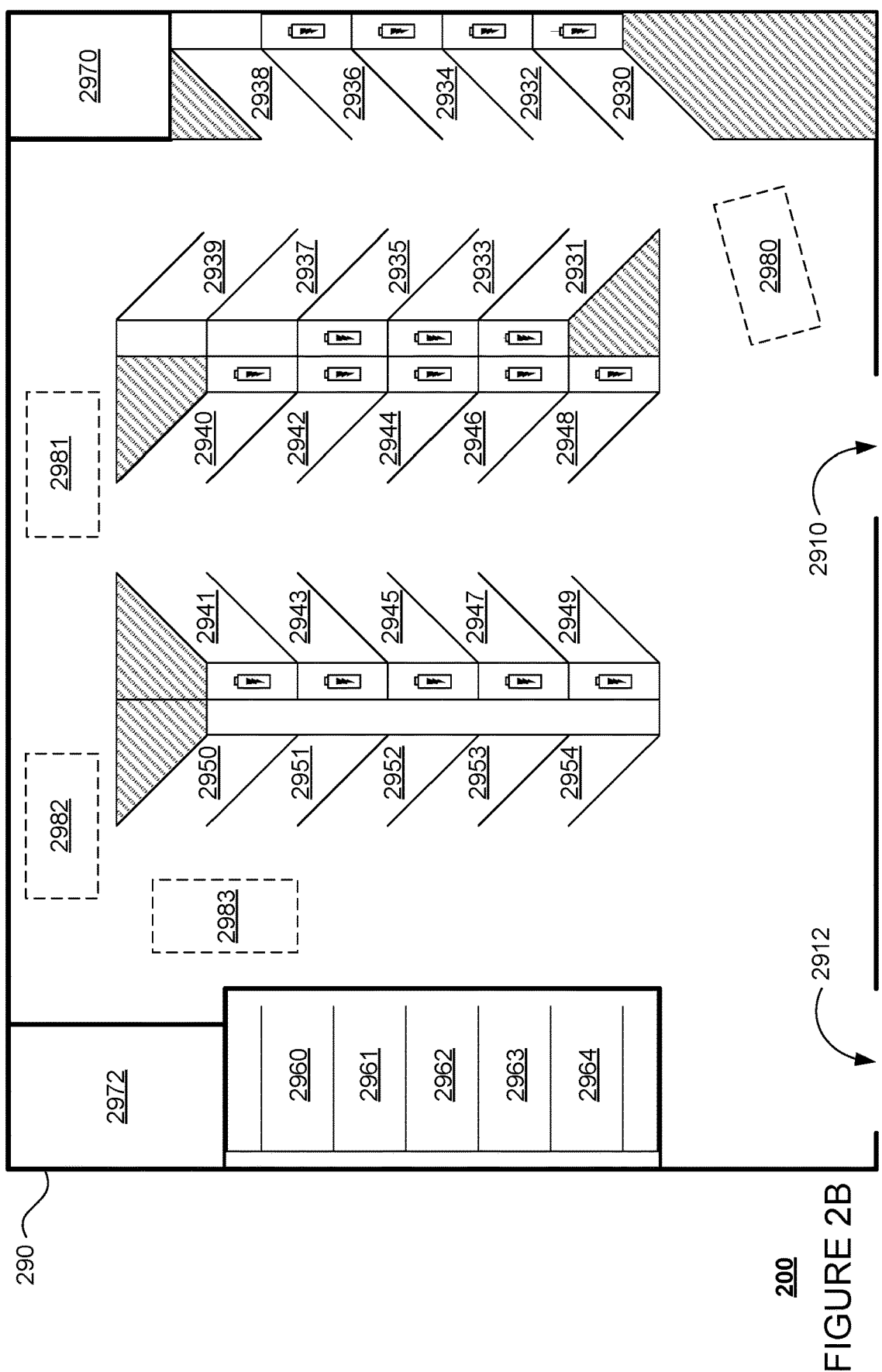

FIGS. 2A and 2B are examples of portions of the map information for demonstrative purposes. As shown in FIG. 2A, the map information 200 includes information identifying the shape, location, and other characteristics of roads and other drivable areas (e.g., parking lots), including roads 210, 220, 230, 240, 250, 260 and others within a geographic area 202. The map information 200 may also include more fine-grained information such as the shape, location and other characteristics of lane markers, lane lines curbs or other road edges which define the shape, location and other characteristics of lanes, traffic control devices such as yield signs, traffic lights, and stop signs, as well as various other features. Such detail is not depicted in the map information 200 for ease of understanding. Compass 270 provides a directional arrow for reference only and need not necessarily be included in the map information as such. However, in addition to these features, the map information may also include information that identifies the direction of traffic and speed limits for each lane or other drivable area as well as information that allows the computing devices 110 to determine whether the autonomous vehicle has the right of way to complete a particular maneuver (i.e. complete a turn or cross a lane of traffic or intersection), as well as other features such as buildings, waterways (such as waterway 280), vegetation, signs, and depot areas 290, 292 etc.

FIG. 2B provides a detailed view of a depot area, here depot area 290 of FIG. 2A. In this example, the map information 200 for the depot area 290, includes information identifying the shape, location, and other characteristics of depot entrance 2910, depot exit 2912, stopping locations (e.g., parking spots) 2930-2955, 2960-2964, buildings 2970, 2972 (for example, for storing supplies and providing services, etc. for human operators working at the depot area 290), as well as staging areas 2980-2983. Each of these staging areas and stopping locations are depicted as a two-dimensional area, but the map information may also include information identifying a two or three-dimensional point (e.g., latitude and longitude or some other coordinates) which can be set as a destination for each staging area or stopping location in order to enable the autonomous vehicle to control itself (e.g., by planning routes and trajectories) to that staging area or stopping location. Such points may thus enable the autonomous vehicle to position itself within the staging area or stopping location as described further below.

Each staging area may enable an autonomous vehicle to observe stopping locations within a depot area which have some amenity that may enable the autonomous vehicle to have the potential needs associated with that staging area addressed. The "observable" stopping locations for each staging area may be predefined in the map information. For instance, the map information may include an association between staging area 2980 and stopping locations 2930-2939, an association between staging area 2981 and stopping locations 2940-2949, an association between staging area 2982 and stopping locations 2950-2955, and an association between staging area 2983 and stopping locations 2960-2964. In this regard, each time an autonomous vehicle stops within a staging area, the set of observable staging locations which the autonomous vehicle is to determine whether or not are available may be known in advance (as in the examples discussed further below). Such an approach may also reduce the computing resources and effort required to identify stopping locations.

Alternatively, rather than using an explicit association in the map information, observable stopping locations may be considered those that are within a fixed distance of each staging area, such as within a 35-meter radius, 50-meter radius, 90-meter radius, or more or less and also are within an effective field of view of the sensors of the autonomous vehicle's perception system (e.g. the field of view may be limited by buildings or other structures of the depot area, other vehicles, human operators, objects etc.). As another alternative, rather than using such explicit associations or fixed distances, observable stopping locations may be limited only by the features of the autonomous vehicle's perception system (e.g., how far the autonomous vehicle's sensors are able to detect and identify stopping locations corresponding to those in the map information).

For example, a staging area may enable an autonomous vehicle to observe stopping locations which include charging stations. Another staging area may enable an autonomous vehicle to observe stopping locations which include cleaning facilities for internal cleaning, external cleaning and/or sensor cleaning. Another staging area may enable an autonomous vehicle to observe stopping locations which include cleaning facilities for swapping a memory device. Still other staging areas may enable an autonomous vehicle to observe stopping locations with amenities for addressing combinations of needs (e.g., charging and cleaning, charging and maintenance, etc.)

In this regard, the map information may provide additional information about each stopping location, and in particular, what amenities are provided at each stopping location. For example, each of stopping locations 2930-2936, 2942-2948 may include amenities for charging such as charging devices (e.g., charging stations for providing power to the autonomous vehicles). As another example, stopping locations 2937-2939 may include amenities for sensor cleaning and/or memory device swapping, but do not include charging devices. As another example, stopping locations 2950-2955 may include amenities for sensor cleaning and/or memory device swapping. Alternatively, these stopping locations may be designated for long or short-term parking for vehicles without specific needs. As another example, stopping locations 2960-2964 may be covered (e.g. with some sort of overhead shelter) stopping locations (here depicted without charging devices), but which include amenities for internal and/or external cleaning, sensor cleaning, maintenance (e.g., oil changes and inspections), and/or memory device swapping. In many instances, these amenities may require human operators to provide assistance (e.g., to plug in a charging device, perform cleaning, etc.). Such information may allow the autonomous vehicle to safely navigate within the depot area 290.

Each of the staging areas 2980-2983 may be defined as a specific point or a two-dimensional or three-dimensional area within the map information 200. Each of the staging areas may allow the autonomous vehicle 100 to determine whether there is a stopping location available proximate to that staging area. As an example, the staging areas may enable an autonomous vehicle to observe stopping locations at which one or more needs of the autonomous vehicle may be addressed. For instance, the staging area 2980 may enable an autonomous vehicle to observe and determine whether there is a stopping location (for instance, a parking spot) available of the stopping locations 2930-2939, for instance to charge the autonomous vehicle. Similarly, the staging area 2981 may enable an autonomous vehicle to observe and determine whether there is a stopping location available of the stopping locations 2940-2949, for instance to charge the autonomous vehicle. The staging area 2982 may enable an autonomous vehicle to observe and determine whether there is a stopping location available of the stopping locations 2950-2955, for instance to wait for further instructions (e.g., for a next destination to be received from the server computing devices 410 as discussed further below). The staging area 2983 may enable an autonomous vehicle to observe and determine whether there is a stopping location available of the stopping locations 2960-2964. As an example, these stopping locations 2960-2964 may enable the autonomous vehicle to receive sensor cleaning, internal or external cleaning, or other maintenance services. In some examples, the stopping locations may be multi-purpose, for example, each of the stopping locations 2930-2955 may be suitable for an autonomous vehicle to have a memory device swapped or data downloaded from the memory device in addition to those services discussed above with regard to these stopping locations. In some instances, swapping a memory device or downloading data may only be appropriate within the stopping locations 2960-2964 which are covered.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which edges or lanes or other mapped areas are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the autonomous vehicle, etc. Each route may include a list of a plurality of nodes and edges which the autonomous vehicle can use to reach the destination. Routes may be recomputed periodically as the autonomous vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the autonomous vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the autonomous vehicle. The location of the autonomous vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the autonomous vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the autonomous vehicle is a passenger vehicle such as a minivan or car, the autonomous vehicle may include Lidar, cameras, and/or other sensors mounted on or near the roof, fenders, bumpers or other convenient locations.

Figure 3A:
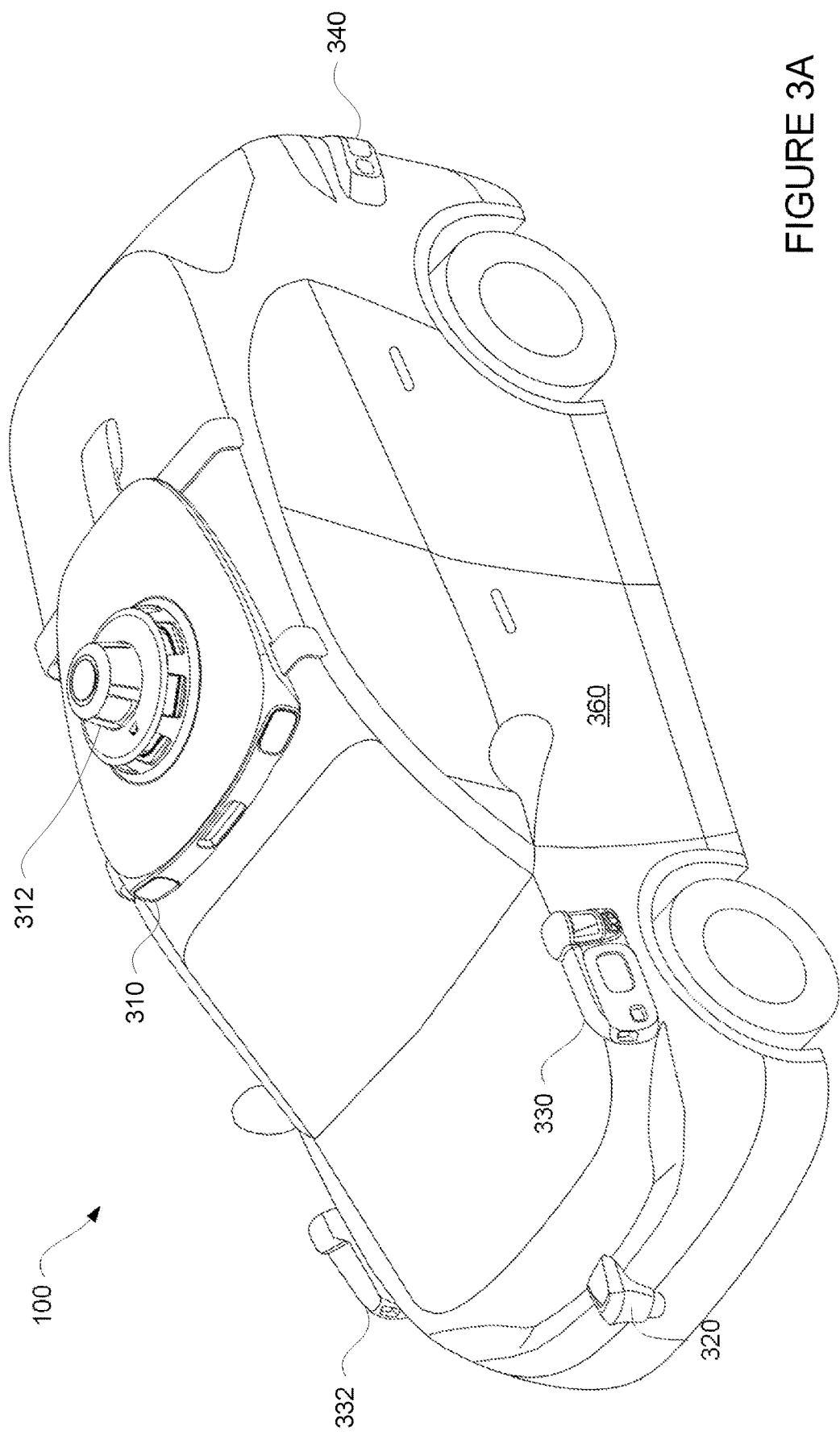
FIG. 3A-3B are example external views of a vehicle in accordance with aspects of the disclosure.
Figure 3B:
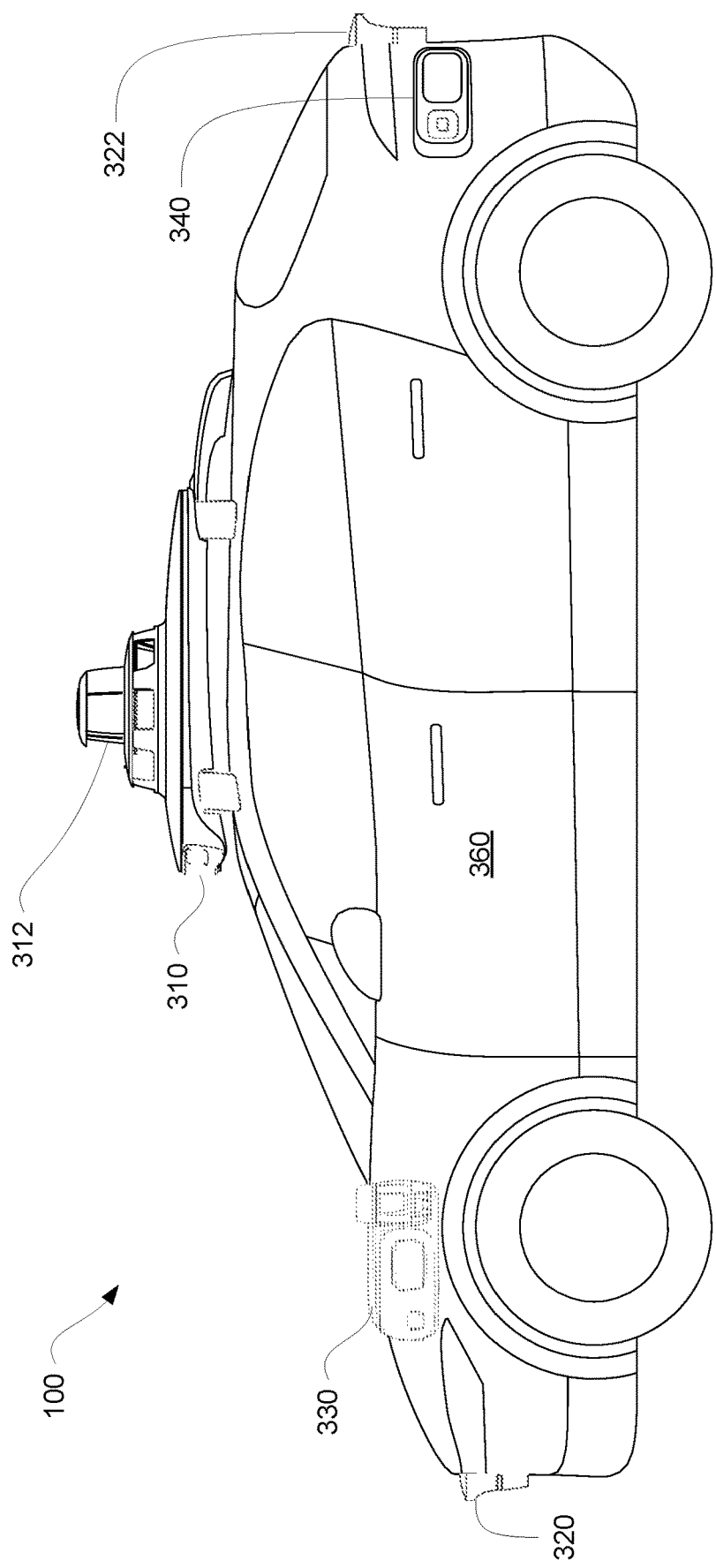

For instance, FIGS. 3A-3B are an example external views of autonomous vehicle 100. In this example, roof-top housing 310 and upper housing 312 may include a LIDAR sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the autonomous vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the autonomous vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, forward planning system 168, routing system 170, positioning system 172, perception system 174, behavior modeling system 176, and power system 178 (i.e. the autonomous vehicle's engine or motor) in order to control the movement, speed, etc. of autonomous vehicle 100 in accordance with the instructions 134 of memory 130.

The various systems of the autonomous vehicle may function using autonomous vehicle control software in order to determine how to control the autonomous vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the autonomous vehicle as well as an emergency vehicle detection system configured to detect emergency vehicles from sensor data generated by sensors of the autonomous vehicle. Each of these detection system software modules may use various models to output a likelihood of a construction zone or an object being an emergency vehicle.

Detected objects, predicted trajectories, various likelihoods from detection system software modules, the map information identifying the autonomous vehicle's environment, position information from the positioning system 170 identifying the location and orientation of the autonomous vehicle, a destination location or node for the autonomous vehicle as well as feedback from various other systems of the autonomous vehicle may be input into a planning system software module of the planning system 168. The planning system 168 may use this input to generate planned trajectories for the autonomous vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the autonomous vehicle to follow the route towards reaching a destination. A control system software module of computing devices 110 may be configured to control movement of the autonomous vehicle, for instance by controlling braking, acceleration and steering of the autonomous vehicle, in order to follow a trajectory.

The computing devices 110 may control the autonomous vehicle in one or more of the autonomous driving modes by controlling various components. For instance, by way of example, computing devices 110 may navigate the autonomous vehicle to a destination location completely autonomously using data from the detailed map information and planning system 168. Computing devices 110 may use the positioning system 170 to determine the autonomous vehicle's location and perception system 174 to detect and respond to objects when needed to reach the location safely. Again, in order to do so, computing device 110 and/or planning system 168 may generate trajectories and cause the autonomous vehicle to follow these trajectories, for instance, by causing the autonomous vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the autonomous vehicle and the wheels of the autonomous vehicle. Again, by controlling these systems, computing devices 110 may also control the drivetrain of the autonomous vehicle in order to maneuver the autonomous vehicle autonomously.

Figure 4:
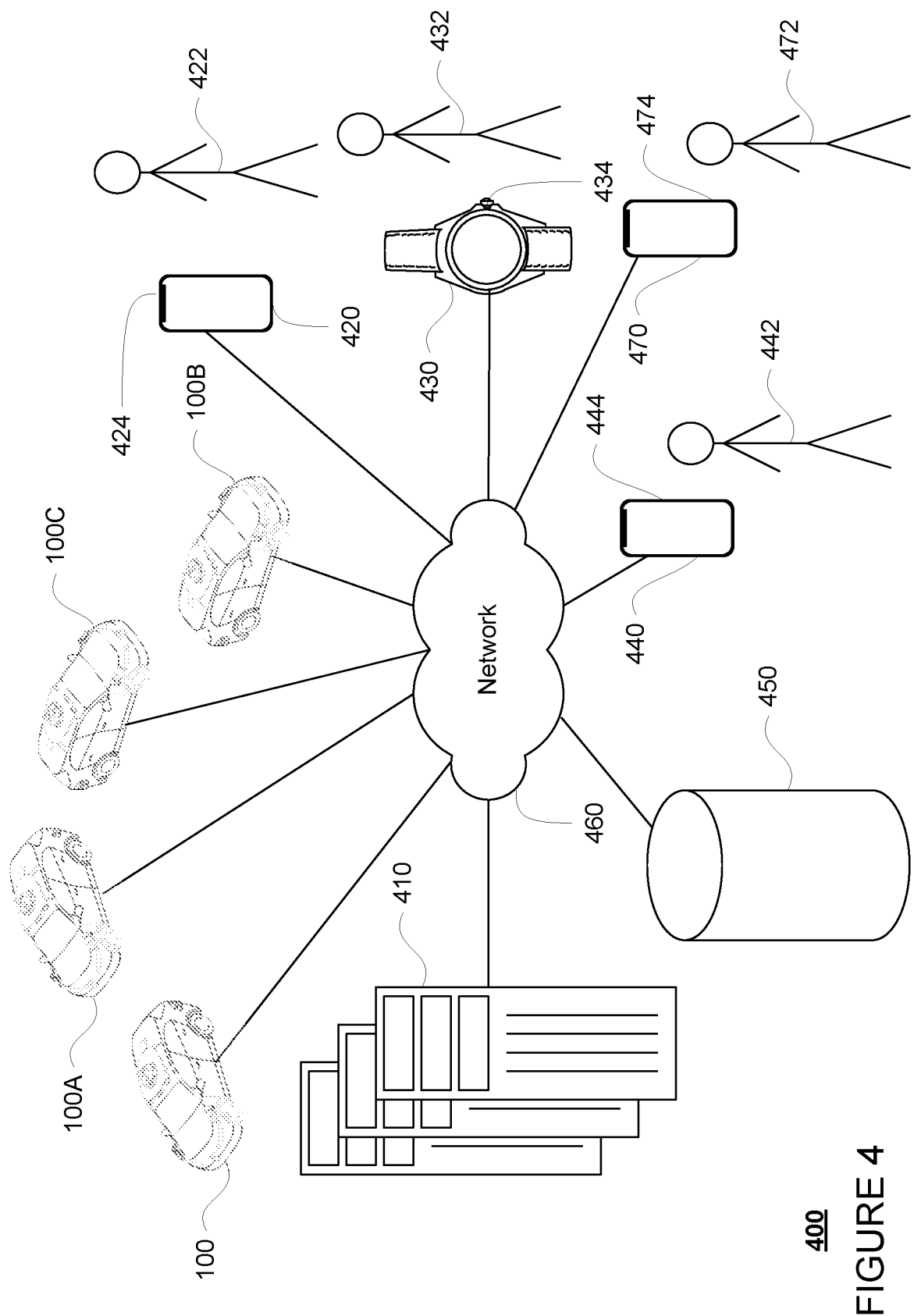
FIG. 4 is a pictorial diagram of an example system in accordance with aspects of the disclosure.
Figure 5:
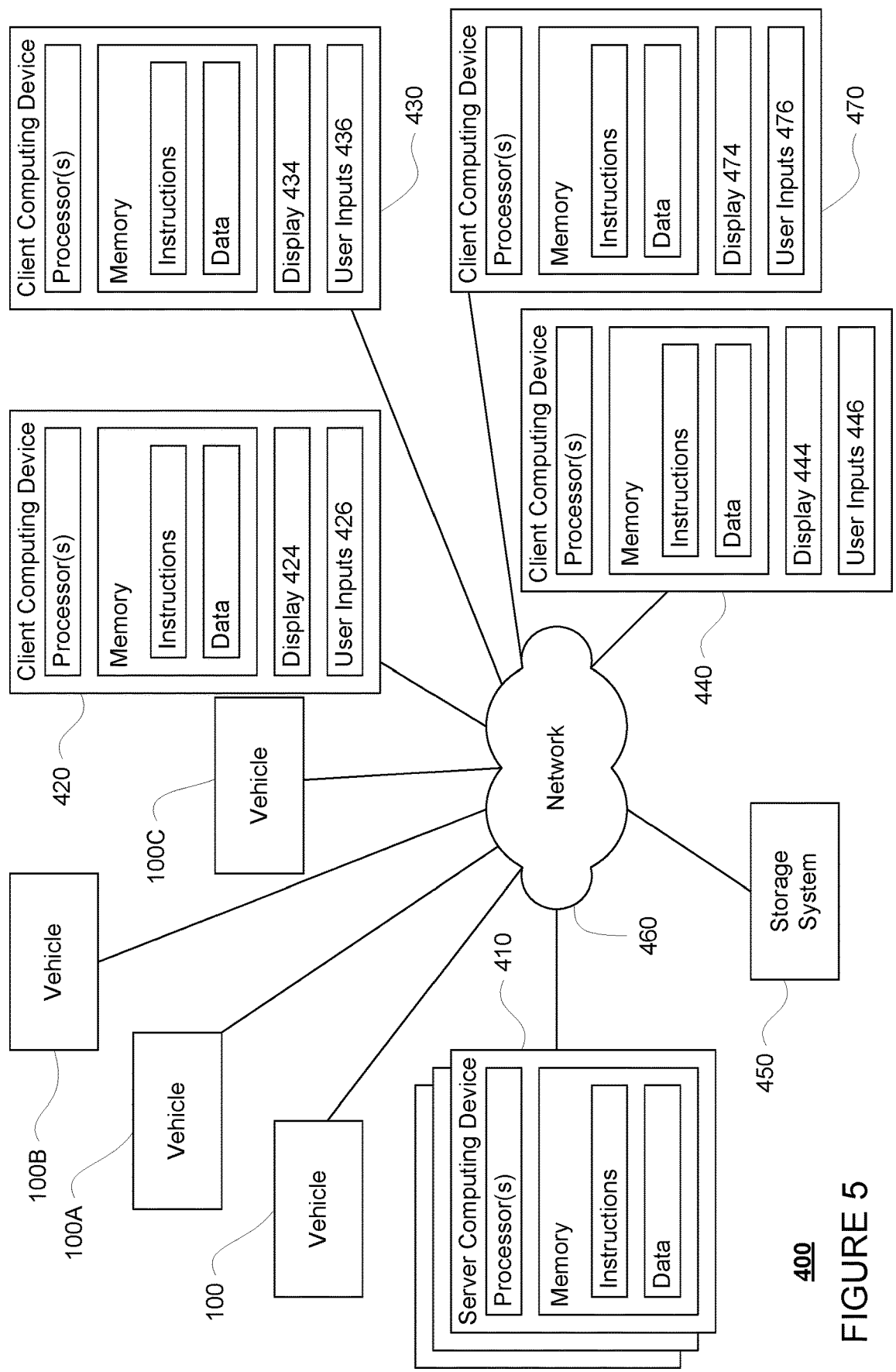
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440, 470 and a storage system 450 connected via a network 460. System 400 also includes autonomous vehicles 100A, 100B and 100C, which may be configured the same as or similarly to autonomous vehicle 100. Although only a few vehicles and computing devices are depicted for simplicity, a typical system may include significantly more.

As shown in FIG. 5, each of computing devices 410, 420, 430, 440, 470 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A, 100B, 100C as well as computing devices 420, 430, 440, 470 via the network 460. For example, autonomous vehicles 100, 100A, 100B, 100C may be a part of a fleet of vehicles that can be dispatched by server computing devices to various locations.

In this regard, the server computing devices 410 may function as a fleet management system which can be used to track the status of autonomous vehicles of the fleet and arrange trips for passengers by assigning and dispatching vehicles such as autonomous vehicles 100, 100A, 100B, 100C. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440, 470. In this regard, computing devices 420, 430, 440 may be considered client computing devices.

As shown in FIG. 3, each client computing device 420, 430, 440, 470 may be a personal computing device intended for use by a user 422, 432, 442, 472 and have all of the components normally used in connection with a personal computing device including a one or more processors (e.g., a central processing unit (CPU)), memory (e.g., RAM and internal hard drives) storing data and instructions, a display such as displays 424, 434, 444, 474 (e.g., a monitor having a screen, a touch-screen, a projector, a television, or other device that is operable to display information), and user input devices 426, 436, 446, 476 (e.g., a mouse, keyboard, touchscreen or microphone). The client computing devices may also include a camera for recording video streams, speakers, a network interface device, and all of the components used for connecting these elements to one another.

Although the client computing devices 420, 430, 440, 470 may each comprise a full-sized personal computing device, they may alternatively comprise mobile computing devices capable of wirelessly exchanging data with a server over a network such as the Internet. By way of example only, client computing device 420, 440, 470 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example the user may input information using a small keyboard, a keypad, microphone, using visual signals with a camera, or a touch screen. As yet another example, a client computing device may be a desktop computing system including a keyboard, mouse, camera and other input devices.

In some examples, client computing device 420 may be a mobile phone used by a passenger of a vehicle. In other words, user 422 may represent a passenger. In addition, client computing device 430 may represent a smart watch for a passenger of a vehicle. In other words, user 432 may represent a passenger. The client computing device 440 may represent a workstation for a human operator, for example, a human operator of a depot area, a remote assistance operator, a technician who provides roadside assistance, or someone who may otherwise provide assistance to an autonomous vehicle and/or a passenger. In other words, user 442 may represent an operator (e.g. operations person) of a transportation service utilizing the autonomous vehicles 100, 100A, 100B, 100C. Although only a few passengers and human operators are shown in FIGS. 4 and 5, any number of such passengers and human operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc. Storage system 450 may store various types of information which may be retrieved or otherwise accessed by a server computing device, such as one or more server computing devices 410, in order to perform some of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 13:
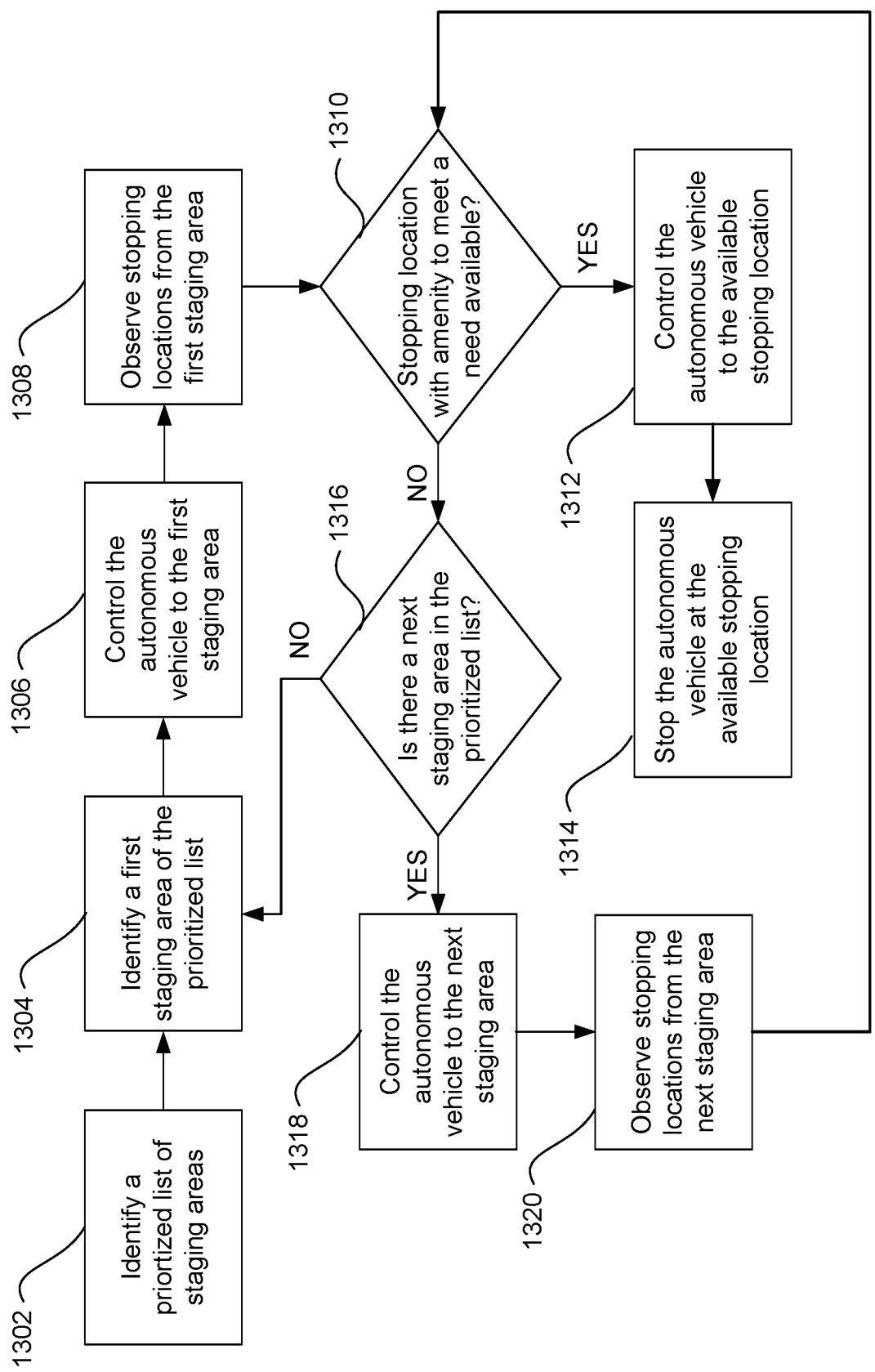
FIG. 13 is a logic flow diagram in accordance with aspects of the disclosure.
Figure 14:
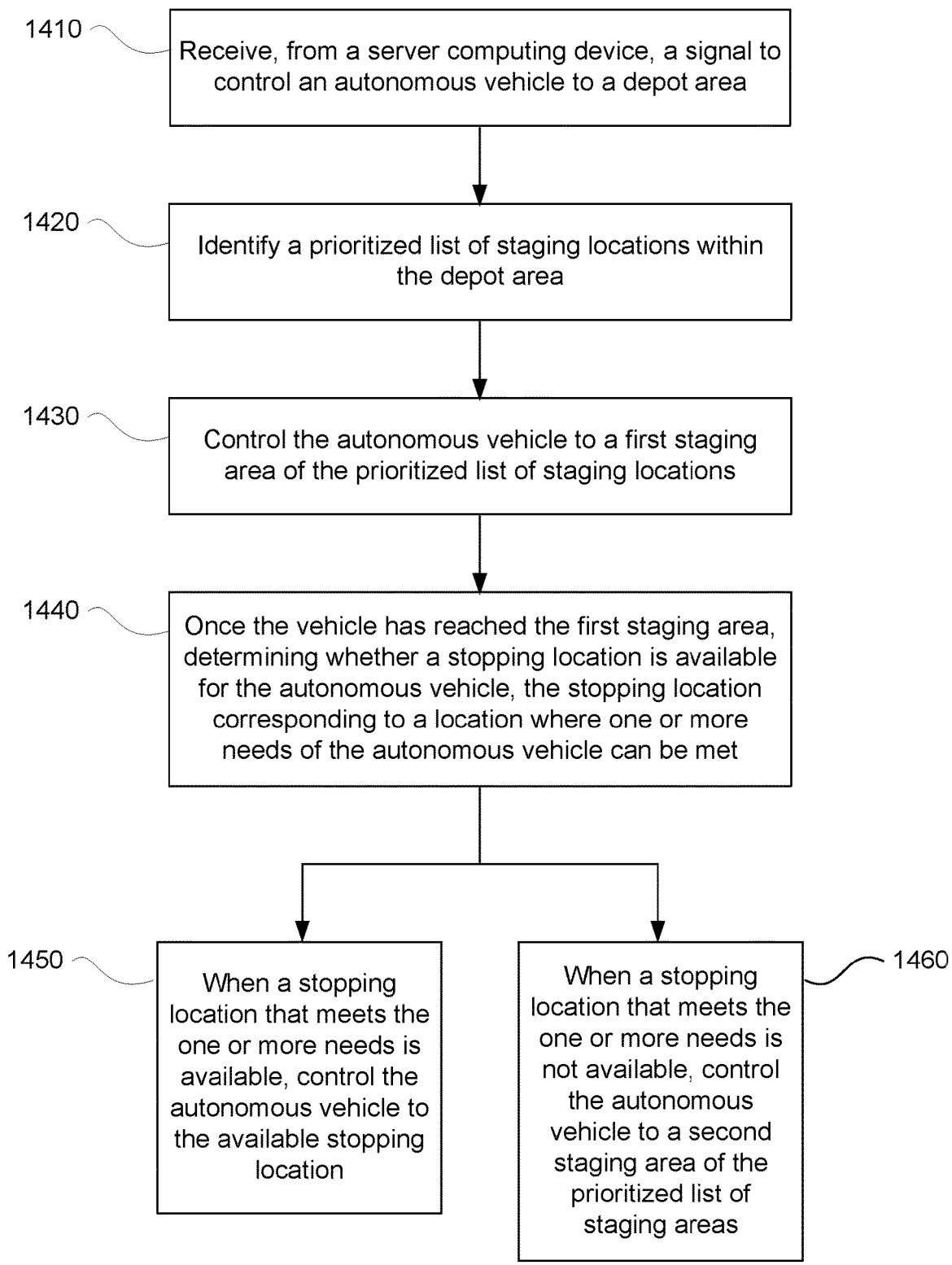
FIG. 14 is a flow diagram in accordance with aspects of the disclosure.

FIGS. 13 and 14 are example logic flow diagram 1300 and flow diagram 1400, respectively. These flow diagrams depict example depot behaviors of autonomous vehicles, which may be performed by one or more processors, such as the one or more processors 120 of the computing devices 110. Turning to FIG. 14, at block 1410, a signal to control an autonomous vehicle to a depot area is received from a server computing device. For example, the computing device 110 may receive instructions from the server computing devices 410 to proceed to a depot area as discussed further below.

Figure 6:
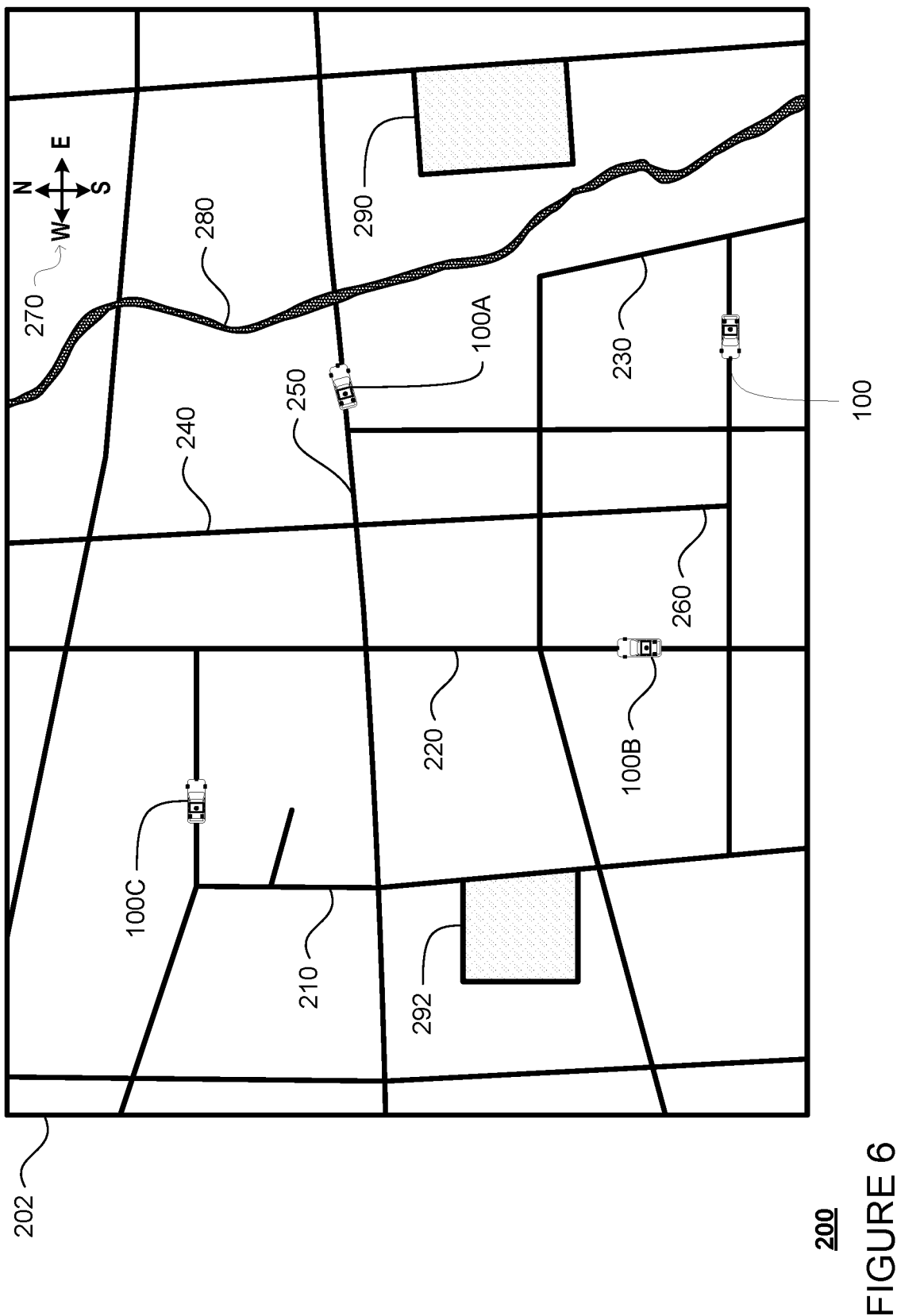
FIG. 6 is an example of map information, autonomous vehicles and data in accordance with aspects of the disclosure.

As an autonomous vehicle of the fleet, such as autonomous vehicle 100, drives around, its various internal systems may monitor the autonomous vehicle's status. This status information may be reported to the server computing devices 410 by the computing devices 110 via the network 460. In some instances, this may include whether the autonomous vehicle 100 is currently servicing a trip, charge or fuel status, whether the autonomous vehicle needs sensors cleaned (e.g., it has been X amount of time since last cleaning or this sensor is determined to have some sort of fouling), memory capacity for a memory device (e.g., for recording log data), tire pressure, etc. FIG. 6 is an example of the map information 200 of FIG. 2A identifying the current locations of the autonomous vehicles 100, 100A, 100B, 100C of the fleet of autonomous vehicles. In this example, the current locations may have been received by the server computing devices 410 from the respective computing devices of these autonomous vehicles.

Based on these status reports, the server computing devices 410 may determine that the autonomous vehicle 100 must proceed to a depot area to have one or more needs addressed. For instance, if the autonomous vehicle 100 is low on fuel or power (e.g., low battery power), requires internal or external cleaning, has a sensor that is determined to have some sort of fouling that cannot be addressed by the autonomous vehicle's cleaning systems (e.g., wipers and cleaning fluid are not sufficient), requires a memory device swap or data download from the memory, requires a software update, requires new hardware (e.g., a broken or outdated sensor), requires a periodic inspection, has reduced tire pressure, etc. In response, the server computing devices 410 may identify a closest depot area to the autonomous vehicle 100 and/or a depot area that is capable of addressing the one or more needs.

In some instances, the server computing devices 410 may also take into account current capacity of the depot areas. In this regard, the server computing devices 410 may monitor the number of autonomous vehicles going to or located at each depot area in real time as well as future predictions in some cases (such as where an autonomous vehicle has been sent to a depot, but has not yet reached that depot). Of course, if there is only one depot area in the service area for the autonomous vehicle 100, the server computing devices 410 may simply send the autonomous vehicle 100 to that depot area.

In this example, the server computing devices 410 may identify the depot area 290 because this depot area may be closest in time or driving distance to the current location of the autonomous vehicle 100 (e.g., closer than the depot area 292), because this depot area is able to service one or more needs of the autonomous vehicle, and/or because this depot area has greater capacity than the depot area 292. The server computing devices 410 may send a signal to the autonomous vehicle 100 directing the autonomous vehicle to travel to the depot area 290. The autonomous vehicle 100 may automatically proceed to the depot area 290 or may complete a current or another task (e.g., transporting goods or services to a particular destination) first.

In some instances, the server computing devices 410 may send an autonomous vehicle to a depot area for other reasons, which may be unrelated to the reports. For example, the server computing devices 410 may send an autonomous vehicle to a depot area if a passenger has reported a lost item (e.g., left a bag or cell phone behind) or if the autonomous vehicle has been flagged by a human operator (e.g., a remote assistance operator) as requiring internal cleaning. As another example, the server computing devices 410 may send all or a portion of the fleet to one or more depot areas in the event of inclement weather (e.g., heavy snow) or other driving conditions that may be outside of a pre-approved operating domain and/or require a grounding of the fleet.

As shown in FIG. 13 at block 1302 and FIG. 14 at block 1420, a prioritized list of staging areas within the depot area is identified. Each staging area of the prioritized list of staging areas enables the autonomous vehicle to observe stopping locations at which a need of the autonomous vehicle may be addressed. For instance, the autonomous vehicle 100 may receive the signal and identify a prioritized list of staging areas within the depot area 290. Each of these prioritized lists may be associated with various sets of potential needs. In this regard, based on one or more needs, an associated prioritized list of staging areas may be identified. Each prioritized list of staging areas and associated set of potential needs may be manually selected by human operators based on the available services (e.g., charging, cleaning, maintenance, etc.) and configurations of each depot area. As such, an autonomous vehicle may be more likely to find a stopping location that is able to address one or more needs of the autonomous vehicle.

Turning to the example of FIG. 2B, if the autonomous vehicle 100 current needs include charging and sensor cleaning, the corresponding prioritized list of staging areas may include staging area 2980 (to look for an available stopping location of the stopping locations 2930-2939 with charging or sensor cleaning amenities), thereafter staging area 2981 (to look for an available stopping location of the stopping locations 2940-2949 with charging amenities), thereafter staging area 2983 (to look for a stopping location with sensor cleaning of the stopping locations 2960-2964), and finally staging area 2982 (to look for an available stopping location of the stopping locations 2950-2955 in order to park and wait for further instructions or a new destination from the server computing devices 410).

As another example, if an autonomous vehicle requires only internal cleaning, the corresponding prioritized list of staging areas may include staging area 2980 (to look for an available stopping location of the stopping locations 2937-2939 with sensor cleaning amenities), 2983 (to look for an available stopping location of the stopping locations 2960-2964 with sensor cleaning amenities) and finally staging area 2982 (to look for an available stopping location of the stopping locations 2950-2955 in order to park and wait for further instructions or a new destination from the server computing devices 410).

As another example, if an autonomous vehicle requires only sensor cleaning, the corresponding prioritized list of staging areas may include staging area 2983 (to look for an available stopping location of the stopping locations 2960-2964 with internal cleaning) and finally staging area 2982 (to look for an available stopping location of the stopping locations 2950-2955 in order to park and wait for further instructions or a new destination from the server computing devices 410).

As another example, if an autonomous vehicle requires only charging, the corresponding prioritized list of staging areas may include staging area 2980 (to look for an available stopping location of the stopping locations 2930-2936 with charging amenities), thereafter staging area 2981 (to look for an available stopping location of the stopping locations 2940-2949 with charging amenities), and finally staging area 2982 (to look for an available stopping location of the stopping locations 2950-2955 in order to park and wait for further instructions or a new destination from the server computing devices 410).

In some instances, the prioritized list of staging areas may be updated in real time based on the status of a depot area. For example, if there is no power (e.g. due to a power outage) to an area of a depot normally used for charging, then the staging area associated with that area may be removed from the prioritized lists. This may be done manually by human operators, and an update may be set out to the autonomous vehicles 100, 100A, 100B, 100C of the fleet as needed. As an example, if the stopping locations 2940-2949 are not available for charging for lack of power, then the staging area 2981 may be removed from any prioritized lists associated with a need including charging. Other examples may include a lack of human operators or supplies available for a particular area of a depot.

In some instances, the prioritized list of staging areas and sets of potential needs may be stored in a relationship table or other storage arrangement in local memory of the autonomous vehicle 100. In such instances, the autonomous vehicle 100 may identify a prioritized list of staging areas by comparing the one or more needs to the sets of potential needs and identifying an identical set of potential needs.

In addition or alternatively, the prioritized list of staging areas and sets of potential needs may be stored in a remote storage system, such as the storage system 450. For instance, the server computing devices 410 may access the storage system 450 and identify a prioritized list of staging areas. In such instances, the server computing devices 410 may send the prioritized list of staging areas to the autonomous vehicle 100 with the signal identifying the depot area, when the autonomous vehicle is within some predetermined distance of the depot area, or when the autonomous vehicle arrives at the depot area.

Figure 7:
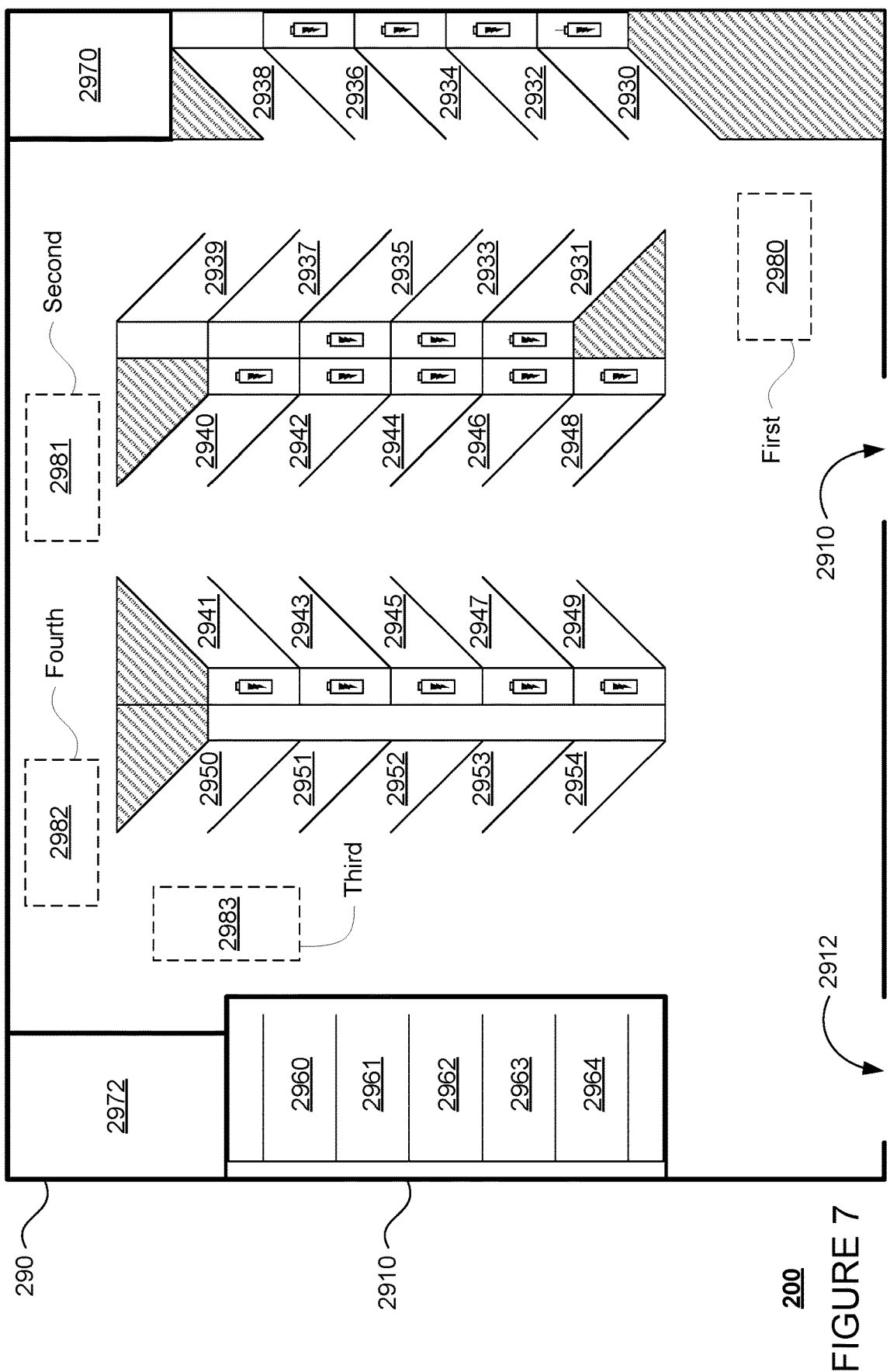
FIG. 7 is an example of map information and a prioritized list of staging areas in accordance with aspects of the disclosure.

Turning to the example of FIG. 7, the one or more needs of the autonomous vehicle 100 may include charging, swapping of a memory device, and sensor cleaning. As such, the computing device 110 may identify a prioritized list of staging areas including staging area 2980 (first), staging area 2981 (second), staging area 2983 (third), and staging area 2982 (fourth).

Returning to FIG. 13 at block 1304, a first staging area of the prioritized list of staging areas is identified. Thereafter, at block 1306 and as in FIG. 14 at block 1430, the autonomous vehicle is controlled to this first staging area of the prioritized list of staging areas. For instance, autonomous vehicle 100 may then set a first staging area of the prioritized list of staging areas as a destination for the autonomous vehicle and control itself to the first staging area. The autonomous vehicle's routing system 170 may then generate a route to the first staging area, and the planning system 168 may generate trajectories in order to follow the route to the first staging area.

Figure 8A:
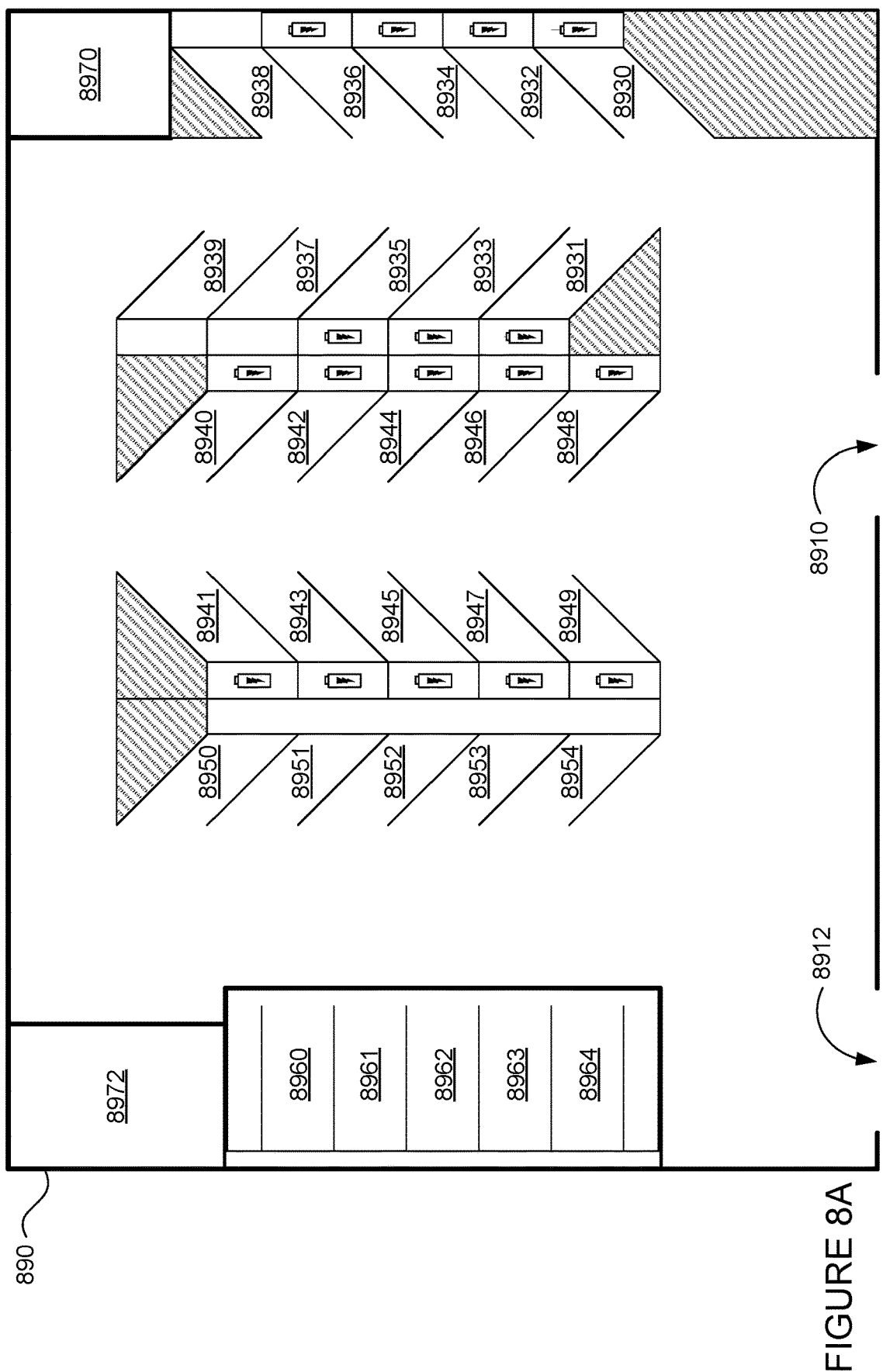
FIGS. 8A-8C are example views of a driving environment in accordance with aspects of the disclosure.

FIGS. 8A-8E represents a geographic area 890 corresponding to the depot area 290. FIG. 8A depicts various references which are removed from FIGS. 8B-8E for ease of understanding. The geographic area 890 includes features depot entrance 8910, depot exit 8912, stopping locations 8930-2939 with charging devices, stopping locations 8940-2949 with charging devices, stopping locations 8950-2955 without charging devices, covered stopping locations 8960-8964, and buildings 8970, 8972. Each of these corresponds to the depot entrance 2910, depot exit 2912, stopping locations 2930-2955, 2960-2964, and buildings 2970, 2972 of the map information 200, respectively.

Figure 8B:
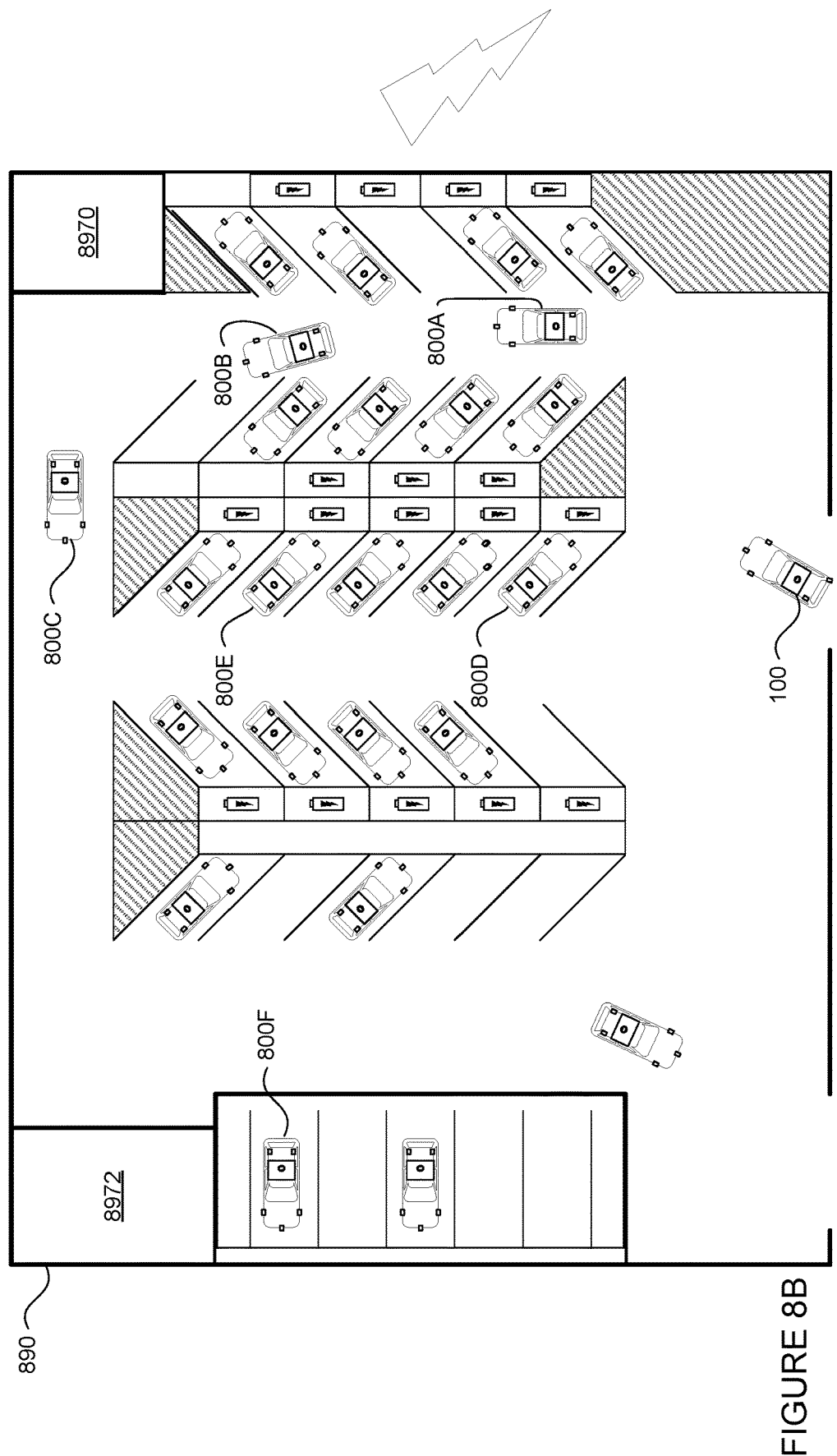

FIG. 8B depicts autonomous vehicle 100 entering the geographic area 890 through entrance 8910. FIG. 8B depicts various autonomous vehicles of the fleet of autonomous vehicles, each of which may be configured the same or similarly to the autonomous vehicle 100. Some of these autonomous vehicles, such as autonomous vehicles 800A, 800B, 800C may be moving through the geographic area 890, and others of the autonomous vehicles, such as autonomous vehicles 800D, 800E, 800F may be stopped in stopping locations. In this regard, various of the stopping locations of FIG. 8A are occupied by such autonomous vehicles.

Figure 8C:
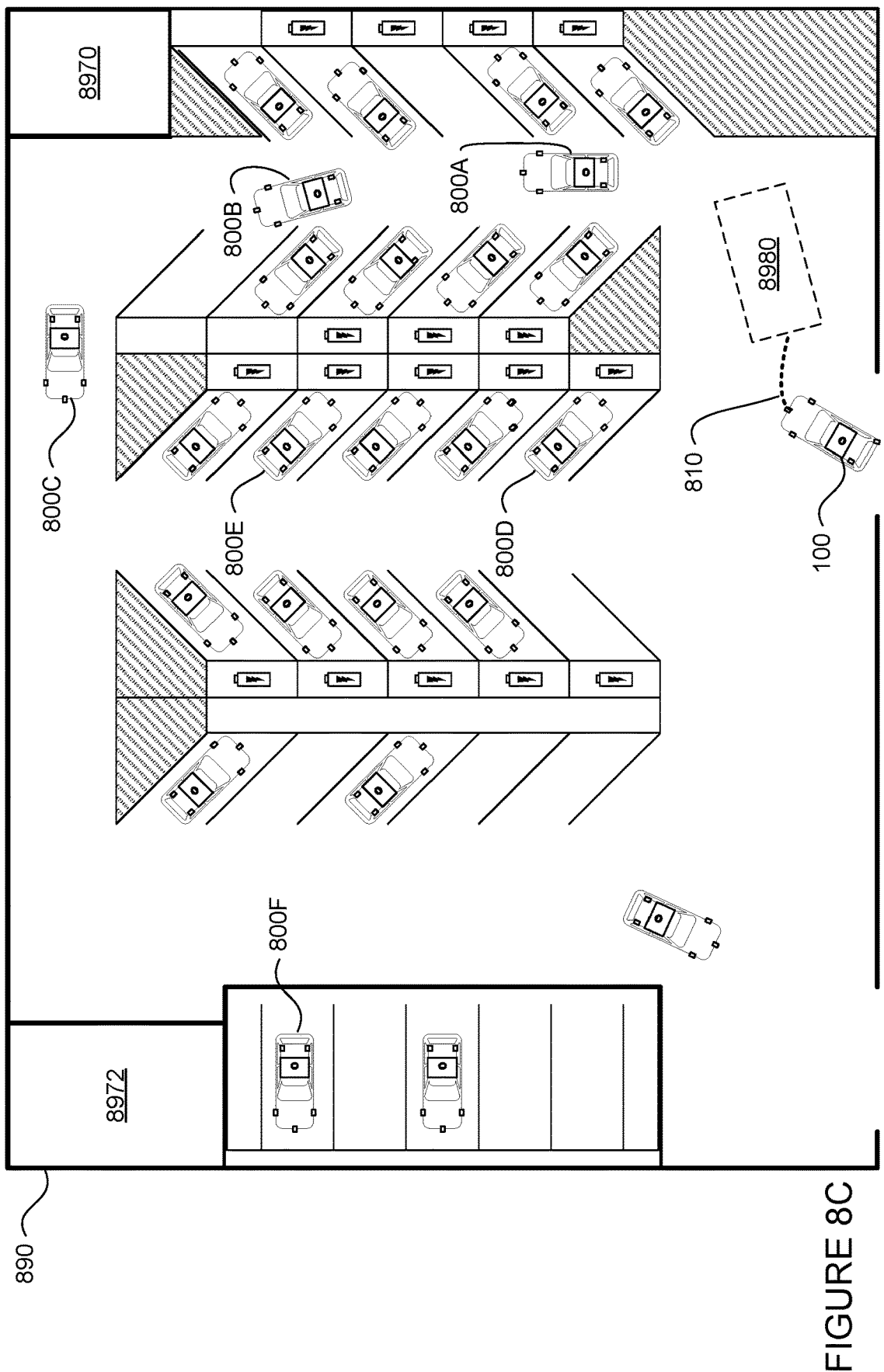

Turning to FIG. 8C, using the example of the prioritized list and needs of the example of FIG. 7, the computing devices 110 may identify to the prioritized list of staging locations and identify the staging area 2980. The computing devices 110 may then set the location of area 8980 (corresponding to the location of the staging area 2980) as a destination of the autonomous vehicle. The autonomous vehicle's routing system may then generate a route 810 to the staging area 2980, and the planning system 168 may generate trajectories in order to follow the route 810 to the area 8980 as described above.

Returning to FIG. 13, at block 1308, stopping locations may be observed from the first staging area. As shown in block 1310 and in FIG. 14, at block 1440, once the autonomous vehicle has reached the first staging area, whether a stopping location is available that meets a need of the autonomous vehicle is determined. For example, the perception system 174 perception system 174 may collect sensor data, and the computing devices 110 may use this sensor data to determine whether a stopping location which can be observed from the first staging area and which includes an amenity that can meet at least one of the needs of the autonomous vehicle is available as shown in block 1310.

Figure 9:
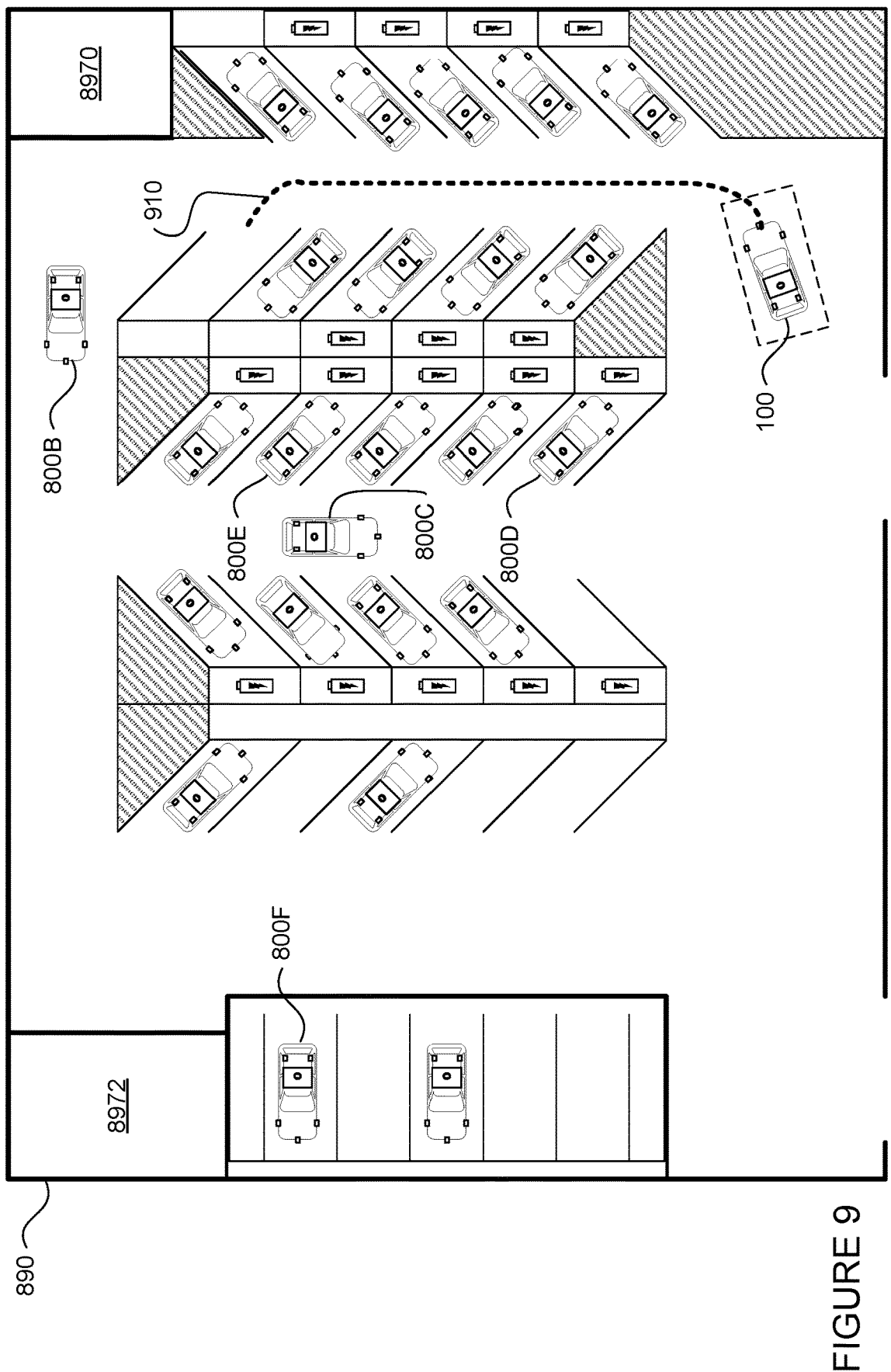
FIG. 9 is an example view of a driving environment and an autonomous vehicle in accordance with aspects of the disclosure.

Returning to FIG. 14, at block 1450, when a stopping location that meets the one or more needs is available, the autonomous vehicle is controlled to the available stopping location. When at the first staging area, when the computing devices 110 identifies an available stopping location that includes an amenity that can meet at least one of the needs of the autonomous vehicle (e.g. "YES" from block 1310), the autonomous vehicle may control itself to that stopping location as shown in block 1312 and stop the autonomous vehicle as shown in block 1314. For example, turning to FIG. 9, once the autonomous vehicle reaches the area 8980, the perception system 174 may collect sensor data, and the computing devices 110 may use this sensor data to determine that stopping location 8939 (corresponding to stopping location 2939) and which includes amenities for sensor cleaning (one of the needs of the autonomous vehicle 100) is available. In this example, in the time that the autonomous vehicle 100 took to reach the area 8980, the autonomous vehicle 800B moved out of the stopping location 8939. As such, this stopping location is now available. The autonomous vehicle's routing system 170 may then generate a route 910 to the stopping location 8939, and the planning system 168 may generate trajectories in order to follow the route 1110 to the stopping location 8939. In this example, the stopping location corresponds to a location where one or more needs of the autonomous vehicle 100 can be met, here charging.

Figure 10A:
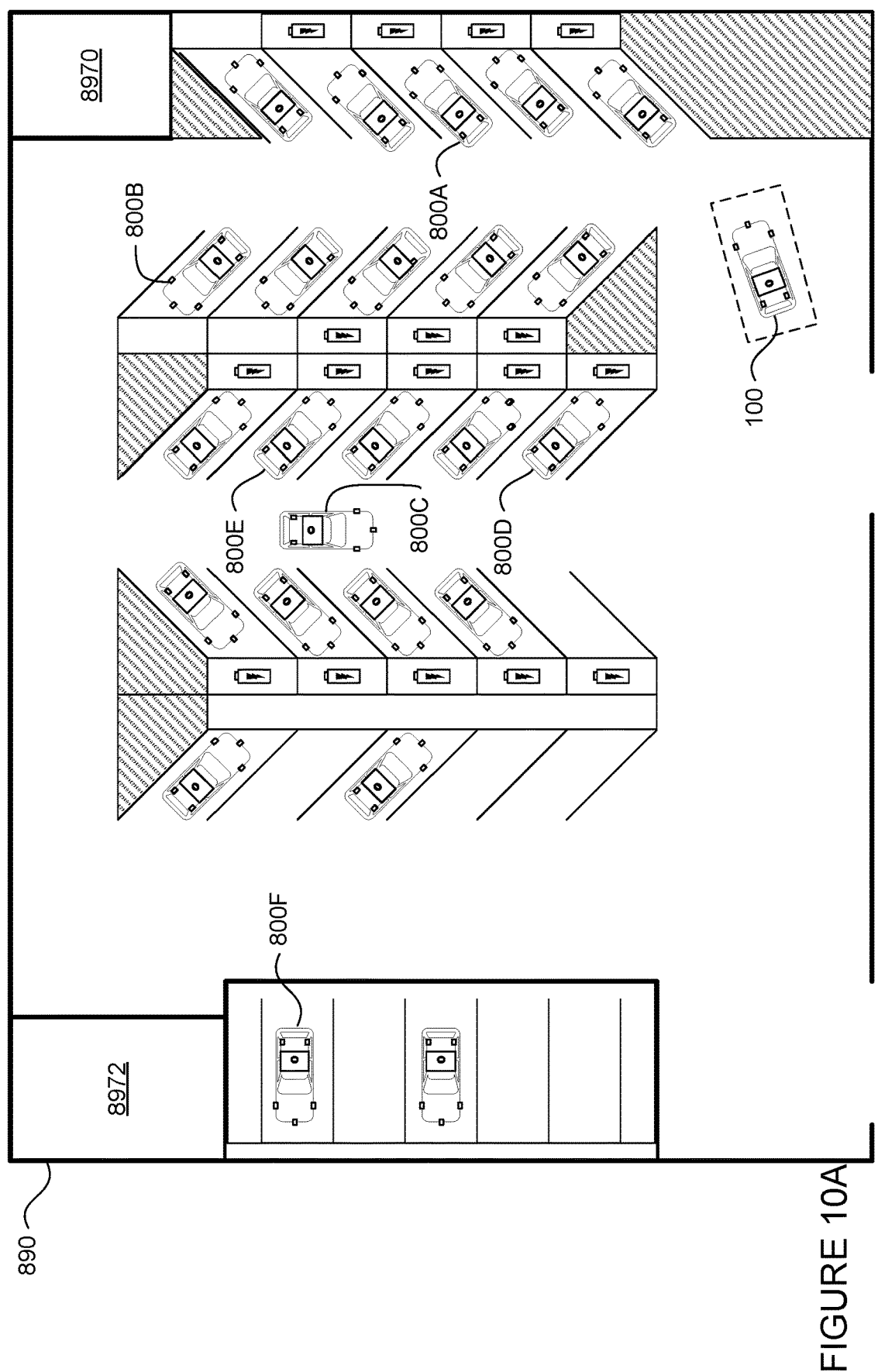
FIGS. 10A and 10B are example views of a driving environment, an autonomous vehicle, and a route to a stopping location in accordance with aspects of the disclosure.

In some instances, there may not be any stopping locations available which can be observed from this first staging area (e.g. "NO" from block 1310). FIG. 10A depicts the autonomous vehicle stopped with the area 8980 corresponding to the staging area 2980. In this example, in the time that the autonomous vehicle 100 took to reach the area 8980, the autonomous vehicle 800A moved into stopping location 8934 and the autonomous vehicle 800B moved into the stopping location 8939. Thus, once the autonomous vehicle 100 has reached the area 8980, the perception system 174 may collect sensor data, and the computing devices 110 may use this sensor data to determine that all of the stopping locations 8930-8939 are occupied. Thus, even though stopping locations 8934, 8939 were available (e.g., not occupied) when the autonomous vehicle 100 entered the geographic area 890, none of the stopping locations 8930-8939 are available for the autonomous vehicle 100 to stop.

Figure 10B:
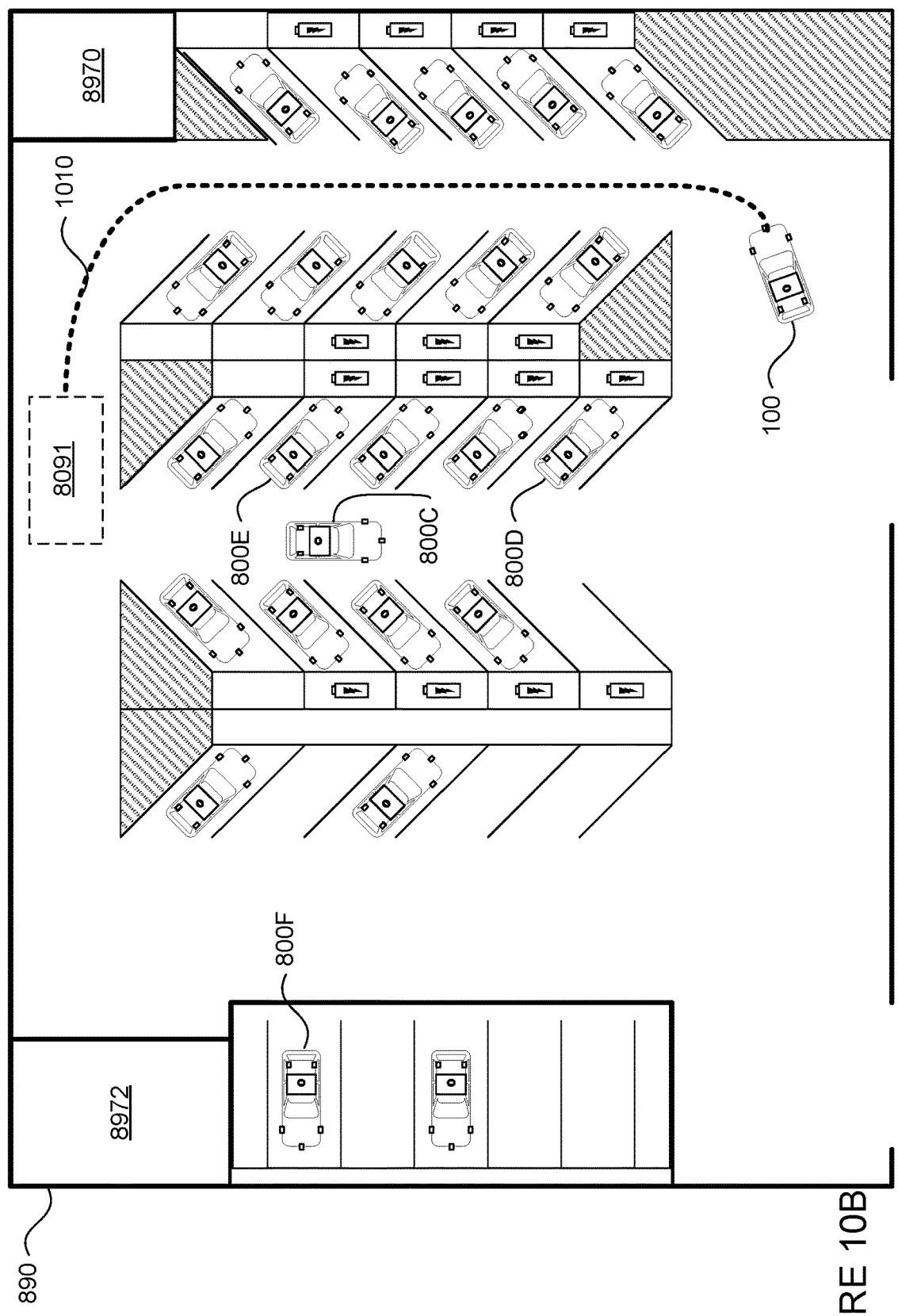

Returning to FIG. 13, at block 1316, whether there is a next staging area of the prioritized list of staging areas is determined. For instance as shown in FIG. 14, at block 1460, based on the determination of block 1440, when a stopping location that meets the one or more needs is not available, the autonomous vehicle is controlled to a second staging area of the prioritized list of staging areas. For example, when at the first staging area as depicted in FIG. 10B, if the computing devices 110 determine that there are no stopping locations available, the computing devices 110 will identify a next (here, second) staging area of the prioritized list of staging areas. In this regard, using the example above, as shown in FIG. 10B, the computing devices 110 may identify the staging area 2981. The computing devices 110 may then set the location of area 8981 (corresponding to the location of the staging area 2981) as a destination of the autonomous vehicle. The autonomous vehicle's routing system 170 may then generate a route 1010 to the staging area 2981, and the planning system 168 may generate trajectories in order to follow the route 1010 to the area 8980.

Returning to FIG. 13, at block 1318, when there is a next staging area of the prioritized list of staging areas (e.g., "YES" at block 1316), the autonomous vehicle is controlled to that next staging area. For instance as shown in FIG. 14, at block 1460, based on the determination of block 1440, when a stopping location that meets the one or more needs is not available, the autonomous vehicle is controlled to a second staging area of the prioritized list of staging areas. For instance, the autonomous vehicle 100 may then set the second staging area of the prioritized list of staging areas as a destination for the autonomous vehicle and control itself to the second staging area.

In this regard, each prioritized list of staging areas may include at least two staging areas, and potentially three or more depending on the characteristics of the depot area. For example, if there is more than one staging area for identifying available stopping locations for charging, there may be more than one staging area in a prioritized list of staging areas for an autonomous vehicle that requires charging. Moreover, the number of staging areas in the prioritized list of staging areas may also be based on the number of the one or more needs of the autonomous vehicle.

Figure 11:
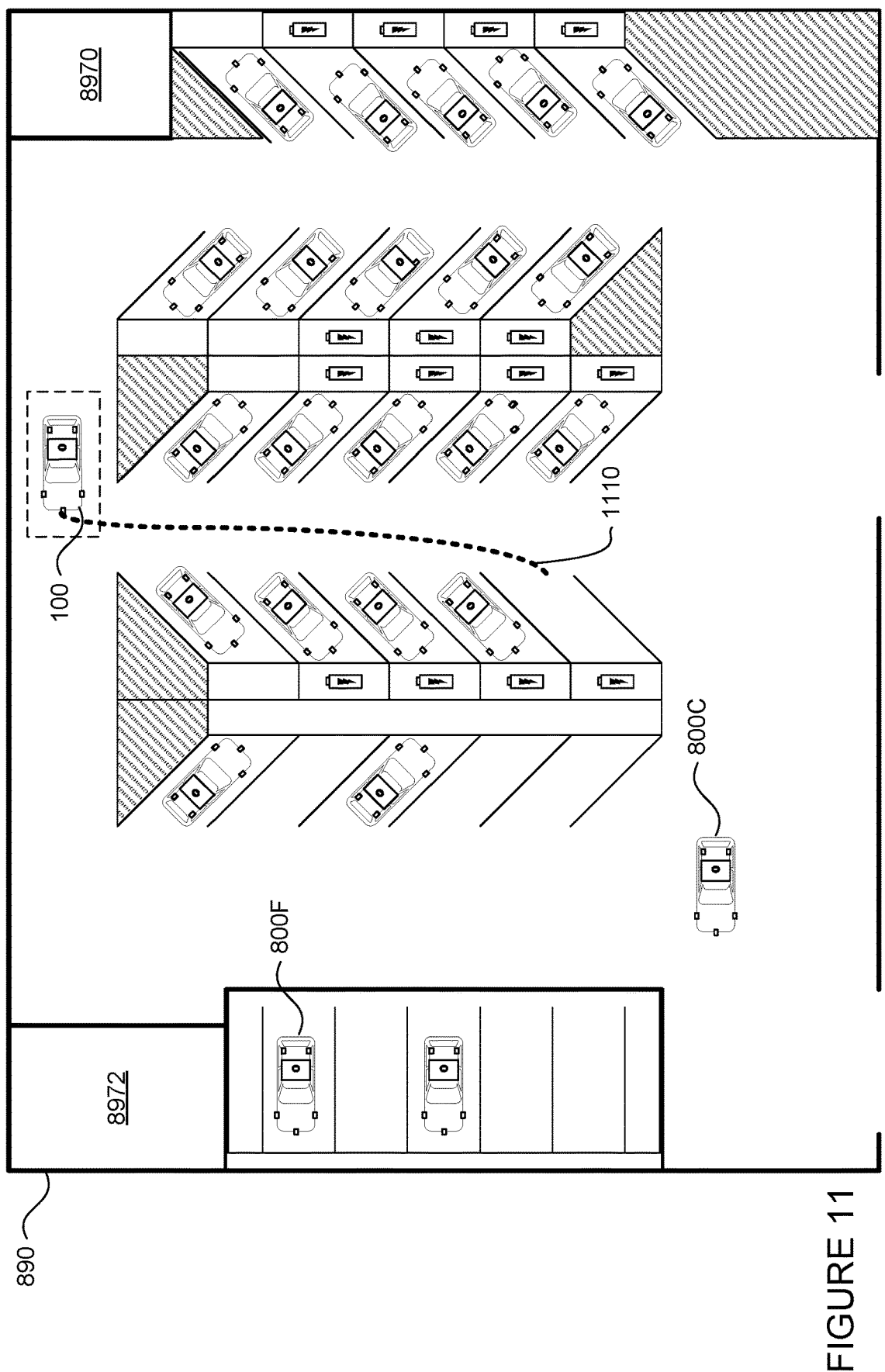
FIG. 11 is an example view of a driving environment and an autonomous vehicle in accordance with aspects of the disclosure.

Returning to FIG. 13, at block 1320, stopping locations may be observed from the next staging area, and the logic returns to block 1310 to determine whether there is an available stopping location that includes an amenity that can meet at least one of the needs of the autonomous vehicle. For instance, when at the next or second staging area, if the autonomous vehicle 100 identifies an available stopping location that includes an amenity that can meet at least one of the needs of the autonomous vehicle, the autonomous vehicle 100 may control itself to that stopping location and stop (as shown in blocks 1312 and 1314, respectively). For example, turning to FIG. 11, once the autonomous vehicle reaches the area 8981, the perception system 174 may collect sensor data, and the computing devices 110 may use this sensor data to determine that stopping location 8949 (corresponding to stopping location 2949) which includes an amenity for charging (a need of the autonomous vehicle 100) is available. The autonomous vehicle's routing system 170 may then generate a route 1110 to the stopping location 8949, and the planning system 168 may generate trajectories in order to follow the route 1110 to the stopping location 8949. In this example, the stopping location corresponds to a location where one or more needs of the autonomous vehicle 100 can be met, here charging.

Figure 12A:
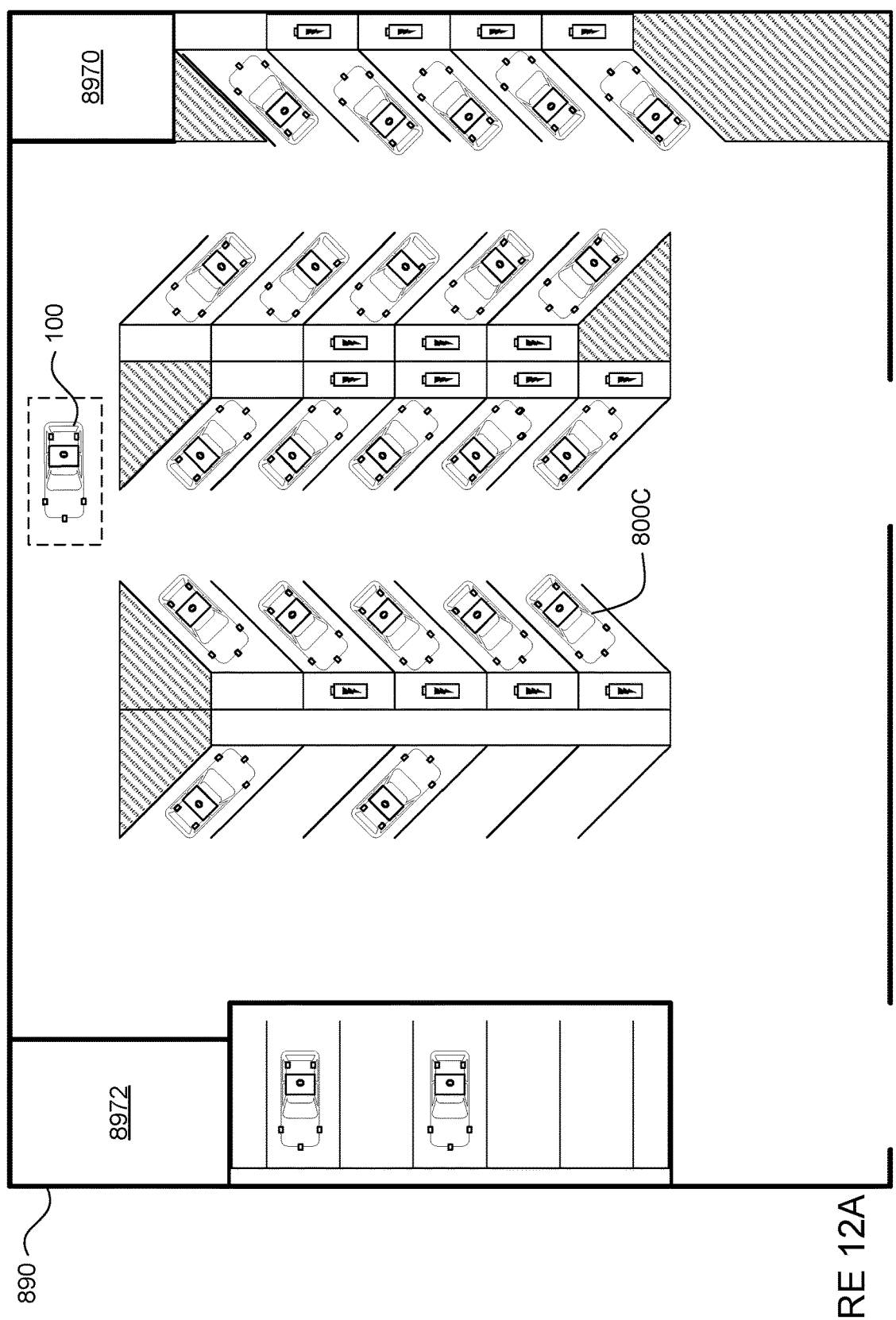
FIGS. 12A and 12B are example views of a driving environment, an autonomous vehicle, and a route to a stopping location in accordance with aspects of the disclosure.

Alternatively, when at the next or second staging area, if the autonomous vehicle 100 determines that there are no stopping locations available (e.g., "NO" at block 1310 of FIG. 13), the autonomous vehicle may determine whether another next or third staging area of the prioritized list of staging areas is available (e.g., returning to block 1316). FIG. 12A depicts the autonomous vehicle stopped with the area 8981 corresponding to the staging area 2981. In this example, in the time that the autonomous vehicle 100 took to reach the area 8981 from the area 8980, the autonomous vehicle 800C moved into stopping location 8949. Thus, once the autonomous vehicle 100 has reached the area 8981, the perception system 174 may collect sensor data, and the computing devices 110 may use this sensor data to determine that all of the stopping locations 8940-8949 are occupied. Thus, even though stopping locations 8949 was available (e.g., not occupied) when the autonomous vehicle 100 entered the depot area and reached the staging area 8981, none of the stopping locations 8940-8949 are available for the autonomous vehicle 100 to stop.

Figure 12B:
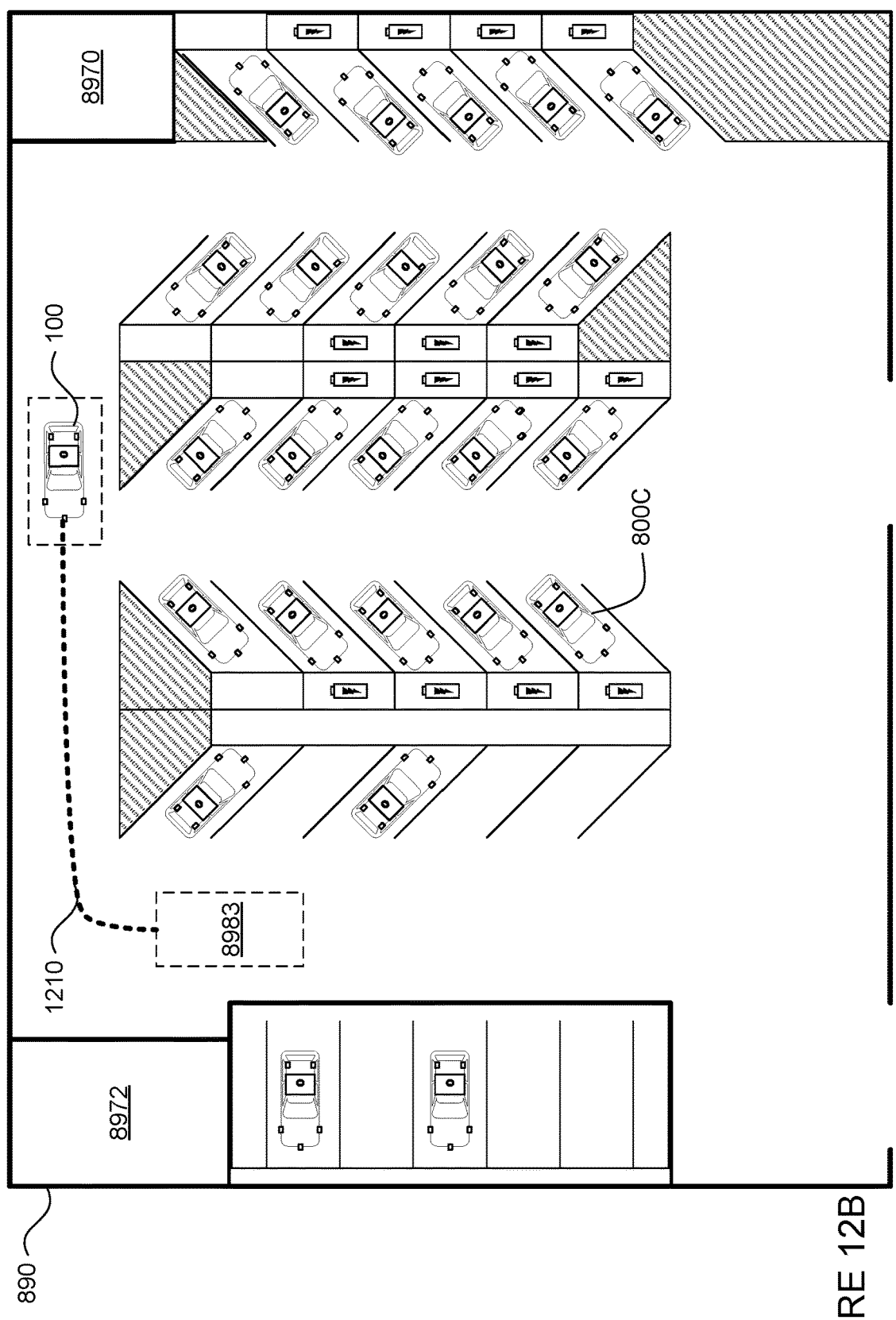

The autonomous vehicle 100 may then set the third staging area of the prioritized list of staging areas as a destination for the autonomous vehicle and control itself to the third staging area to look for an available stopping location. For example, when at the first staging area as depicted in FIG. 12B, if the computing devices 110 determine that there are no stopping locations available, the computing devices 110 will identify a third staging area of the prioritized list of staging areas. In this regard, using the example above, as shown in FIG. 12B, the computing devices 110 may identify the staging area 2983. The computing devices 110 may then set the location of area 8983 (corresponding to the location of the staging area 2983) as a destination of the autonomous vehicle. The autonomous vehicle's routing system 170 may then generate a route 1210 to the staging area 2983, and the planning system 168 may generate trajectories in order to follow the route 1210 to the area 8983. Once the autonomous vehicle reaches the area 8983, the perception system 174 may collect sensor data, and the computing devices 110 may use this sensor data to determine whether stopping location is available. If so, the computing devices may control the autonomous vehicle to the available stopping location, and if not, the computing devices may identify a fourth staging area of the prioritized list of staging areas.

This process may continue until the autonomous vehicle 100 finds a stopping location and stops the autonomous vehicle (e.g., at block 1314 of FIG. 13) or until there a are no further staging areas in the prioritized list of staging areas (e.g., "NO" at block 1316). In many instances, the last staging area may simply be a location for observing a general parking area for vehicles (e.g., staging area 2982 of FIG. 2 and stopping locations 2950-2955 or stopping locations 8950-8950). After some period of time, the computing devices 100 may identify a new prioritized list of staging areas (as discussed above), and the process may begin anew at block 1302 of FIG. 13 (and block 1410 of FIG. 14). Alternatively, as shown in block 1304 of FIG. 13, the first staging location of the prioritized list of staging locations may be identified, and at block 1306, the autonomous vehicle may be controlled back to the first staging location in order to begin the process anew.

Once an autonomous vehicle is at a stopping location, one or more needs may be addressed. For example, if stopped at a charging station, a human operator may connect a charger from a charging station to a charging port of the autonomous vehicle 100. As noted above, in some instances, based on the one or more needs, the human operator may also perform additional steps such as swapping out a memory device or cleaning a sensor as needed while the autonomous vehicle is stopping in the same stopping location of a depot. In some instances, this may also involve one or more additional authentication steps to ensure that the human operator is authorized to engage with the autonomous vehicle 100. This may include, for example, requiring a human operator to enter a code or an identifier for the autonomous vehicle into an application of a client computing device, tapping a badge or tag (e.g., an RF tag tag) with the client computing device, displaying a badge or other credential on the client computing device to a sensor of the perception system of the autonomous vehicle, etc. In some instances, the autonomous vehicle 100 may take some additional action at the stopping location, such as positioning itself at a particular orientation relative to a charging station so that the charging port is within a desired distance from the charging station. As another example, if the one or more needs includes swapping a memory device, the autonomous vehicle 100 may unlock and/or open a door (e.g., a trunk or other panel) of the autonomous vehicle to provide a human operator with access to the memory device.

Once the autonomous vehicle is stopped in a stopping location, in order to better enable the human operator to address the one or more needs as quickly as possible, the autonomous vehicle 100 may include an external display device, such as a screen or LED display, that displays a notification that identifies the one or more needs. Such notifications may also be displayed on internal displays, and in particular when those internal displays are visible externally. In this regard, the computing devices 110 may identify and retrieve notifications stored in the memory 112 based on the one or more needs or current conditions of the autonomous vehicle. In this regard, the notifications may be stored, for example, in a table indexed by needs and/or conditions of the autonomous vehicle. The notifications may also provide other information such as an identifier for the autonomous vehicle (e.g., a 4-digit code that can be used to differentiate the autonomous vehicles of the fleet from one another).

In some instances, the notifications may be displayed on a rotating LED display that "rides" the rotation of a roof-top LIDAR sensor. The notifications may identify a need and/or current state of the autonomous vehicle and may include text, such as words or phrases and/or an images or icons indicative of the need and/or current state. In addition or alternatively, different colors may be displayed (e.g., as a solid field or background color to the aforementioned notifications) in order to indicate different conditions or needs. For example, green may be displayed to indicate that charting is complete or the autonomous vehicle is ready for a new destination, trip or other task, while red may indicate that charging is in progress or assistance is needed (e.g., cleaning, etc.).

Figure 15A:
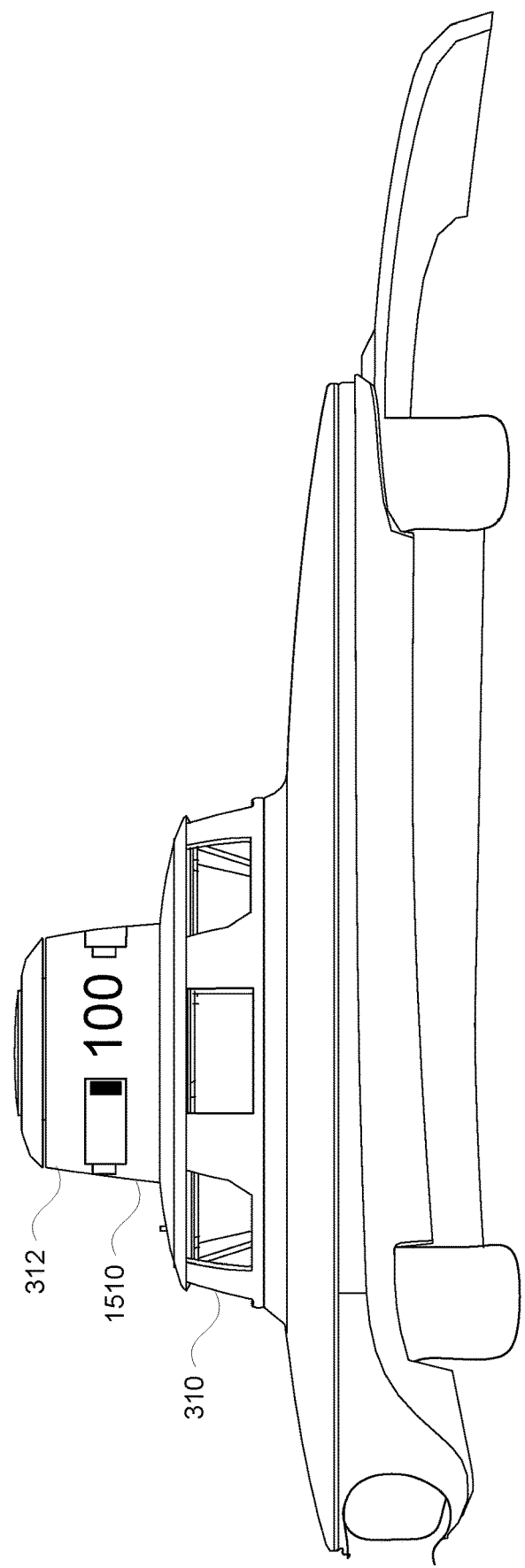
FIG. 15A-15F is an example perspective view of a roof-top housing and display in accordance with aspects of the disclosure.
Figure 15B:
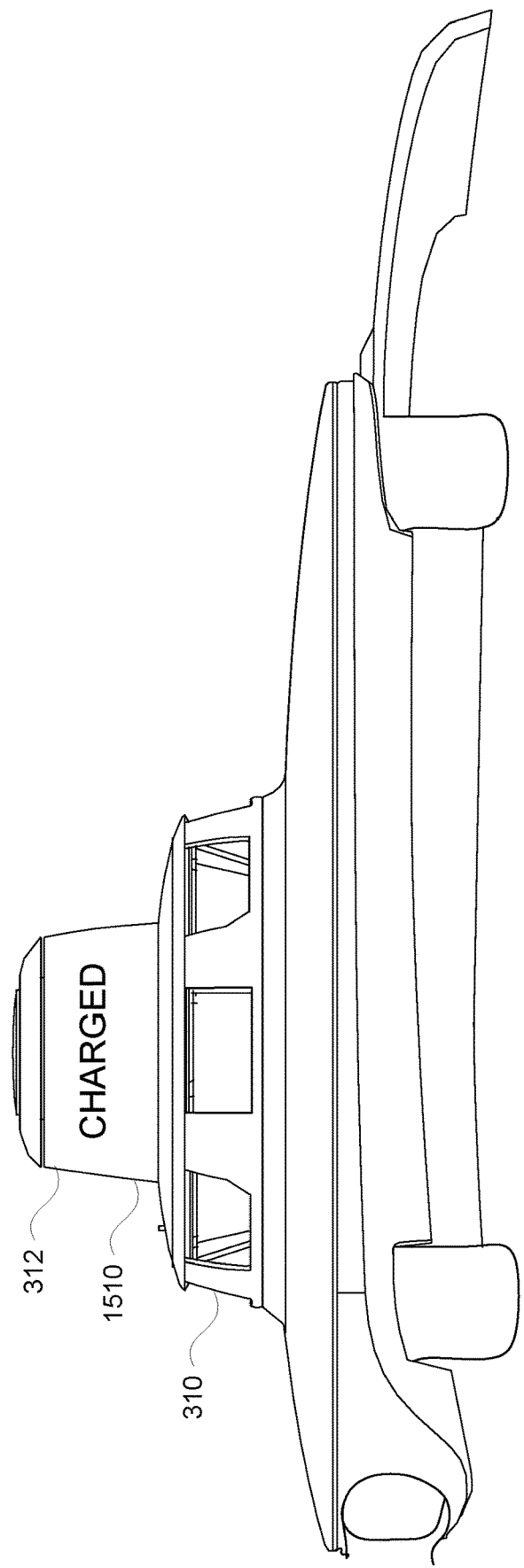
Figure 15C:
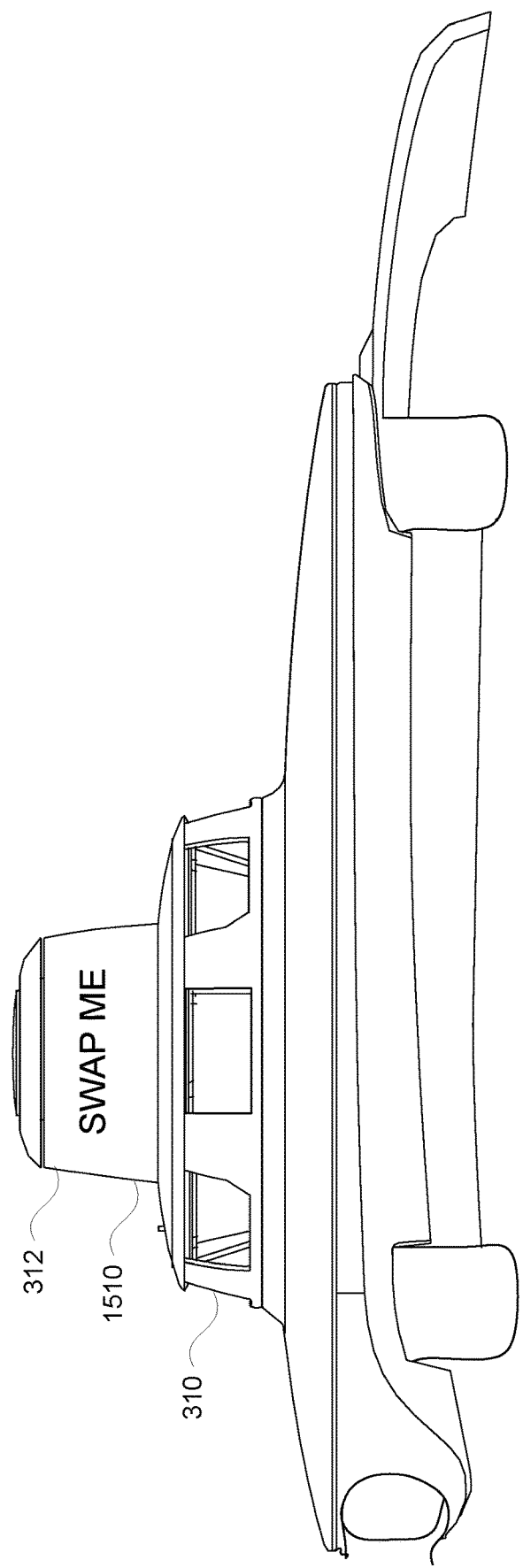
Figure 15D:
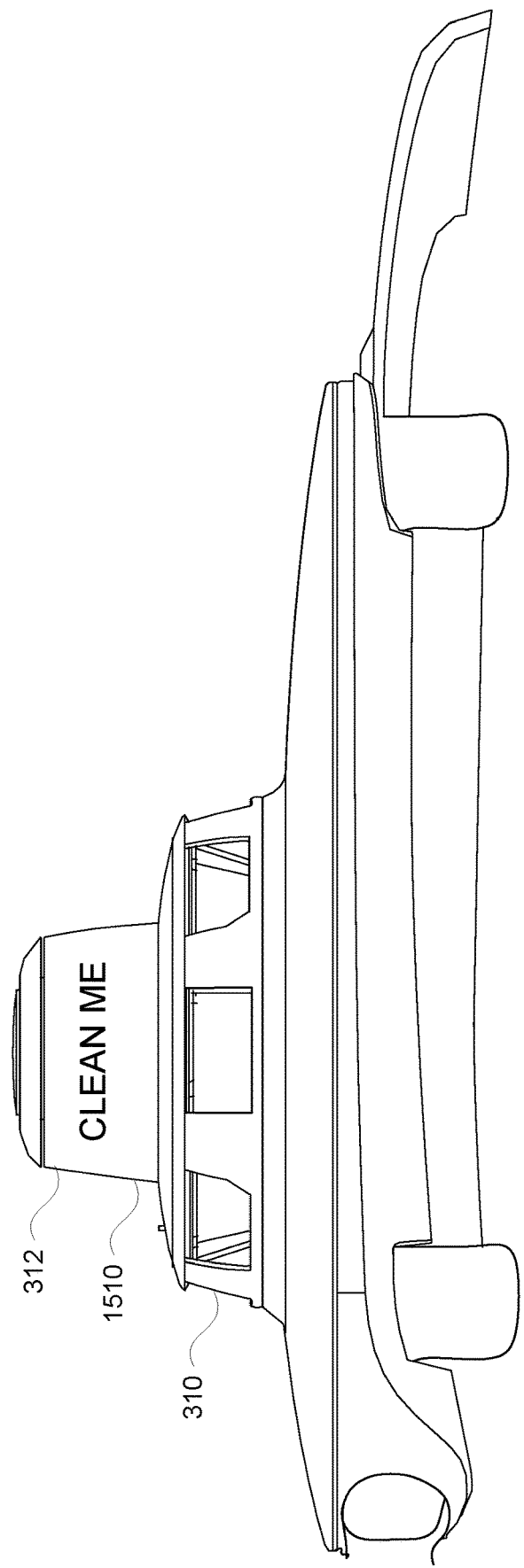
Figure 15E:
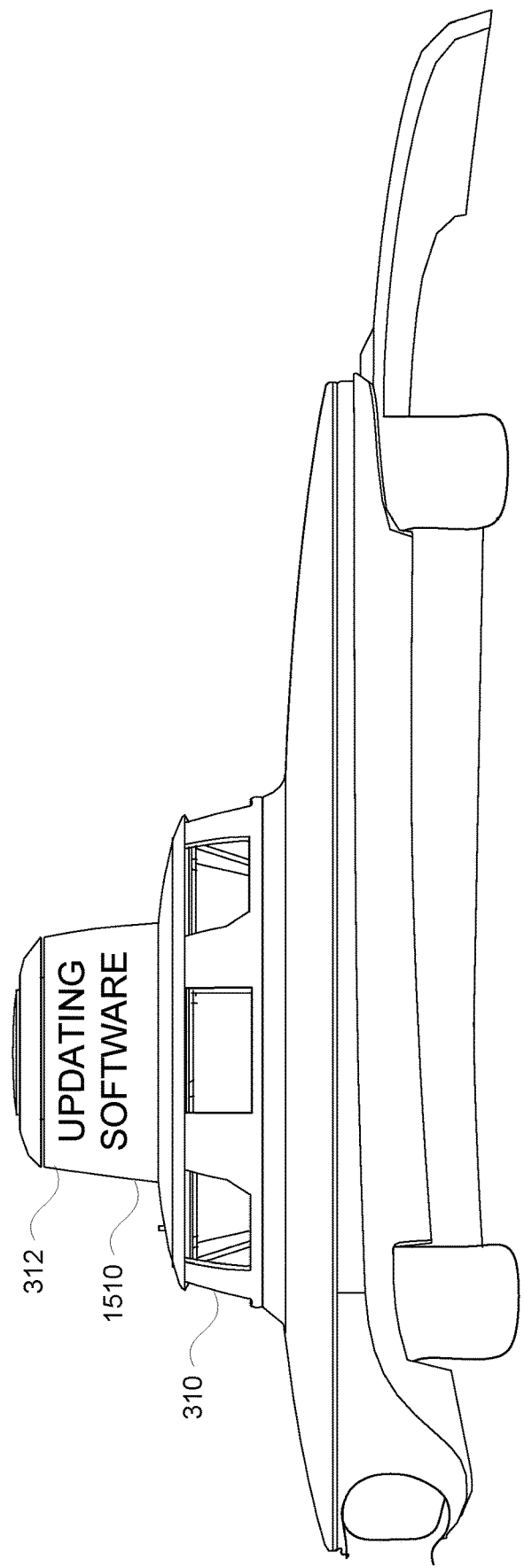
Figure 15E:
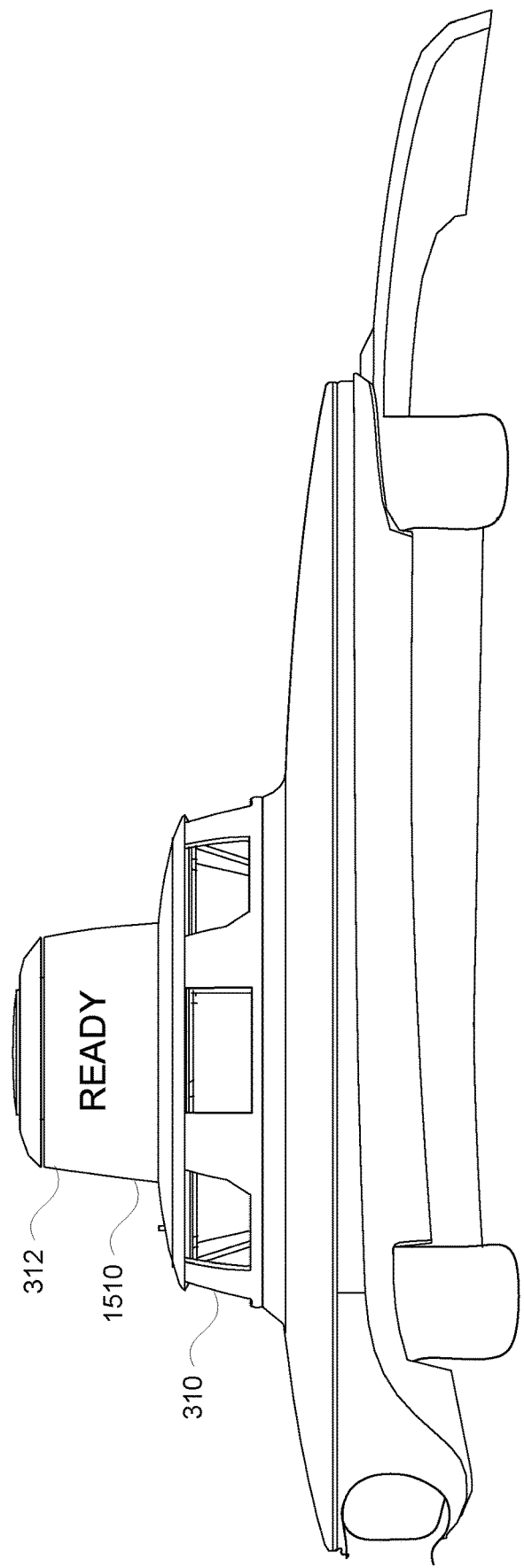
Figure 15F:
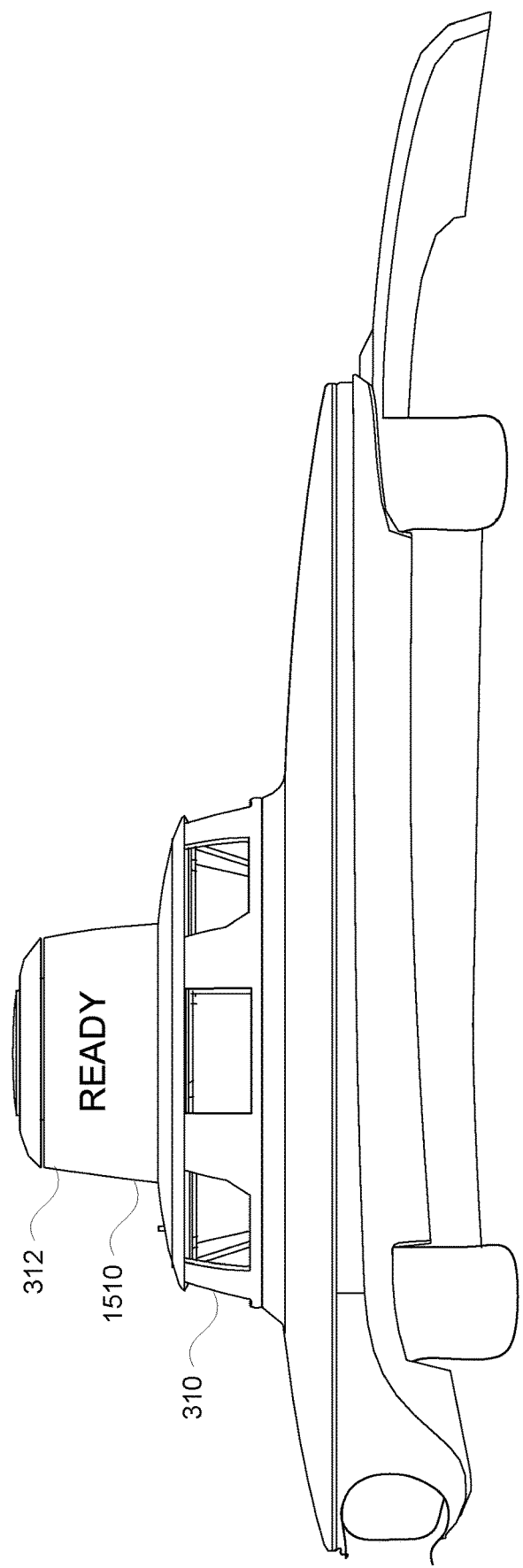

FIGS. 15A-15F are an example perspective views of housings 310, 312 of autonomous vehicle 100. In these examples, housing 310 includes the aforementioned rotating LED display 1510. As shown in FIG. 15A, the display 1510 includes a notification identifying an identifier ("100") for the autonomous vehicle 100 as well as a "low battery" icon. This may indicate to a human operator that the autonomous vehicle 100 requires charging (e.g., needs to be plugged into a charging device. As shown in FIG. 15B, once the charging is complete, a notification may identify that the autonomous vehicle 100 has been charged such as "charged" (as shown in FIG. 15B), "charging complete" or "unplug me." In another example, as shown in FIG. 15C a notification may identify that a memory device needs swapping such as "swap me". In another example, as shown in FIG. 15D, a notification may identify that the autonomous vehicle needs cleaning such as "clean me", "clean my interior", "clean my sensors", etc. In another example, as shown in FIG. 15E, a notification may identify that the autonomous vehicle is currently updating software such as "updating software" (as shown in FIG. 15E), "updating", etc. In another example, as shown in FIG. 15E, a notification may identify that the autonomous vehicle is ready for a new destination or trip (e.g., has no further needs) such as "ready" (as shown in FIG. 15F), "R" (or other block letter to suggest that the autonomous vehicle is ready), "done" etc. In some instances, where there are multiple needs and/or conditions for an autonomous vehicle, two or more of the aforementioned notifications may be displayed sequentially (e.g., display the notification of FIG. 15A, thereafter display the notification of FIG. 15C, thereafter display the notification of FIG. 15A, thereafter display the notification of FIG. 15C, etc.)

In some instances, the human operator may carry a mobile client computing device, such as a personal computer, tablet or mobile phone, which also displays corresponding notifications. This may be transmitted "directly" between the autonomous vehicle 100 and the client computing device (e.g., via a BLUETOOTH, BLUETOOTH LE, or other near field communication connection). In addition or alternatively, the notifications may be transmitted "indirectly" such that the autonomous vehicle 100 may send the notifications to the server computing devices 410 which relays the notifications to the client computing device.

Once a need has been addressed, the autonomous vehicle 100 may determine whether there still one or more needs to be addressed. Based on this, the autonomous vehicle 100 may identify a new prioritized list of staging areas (as discussed above). At some point, when there are no further needs to be addressed, the autonomous vehicle 100 may then proceed to some other destination identified by the server computing devices 410. For example, the autonomous vehicle 100 may now be able to serve trips or may be sent to a location (inside or outside the depot) to park and wait for further instructions (e.g., wait until a new destination for a trip is provided).

In some instances, depot areas may be built and/or designed to provide sufficient stopping locations for the various potential needs for a fleet while also providing sufficient space for staging areas proximate to the stopping locations. Moreover, although the examples described herein include the map information identifying all of the stopping locations in a depot in advance, in some instances, an autonomous vehicle's perception system may identify stopping locations and whether they are occupied in real time. Thus, by providing a prioritized list of staging areas, the autonomous vehicle need only proceed to the staging area to observe whether there is an available stopping location as the stopping locations which can be observed from that staging area would all include at least one amenity to address at least one of the one or more of the needs of that autonomous vehicle.

In some instances, once an autonomous vehicle is within a certain geographic area, the autonomous vehicle 100 may switch from a first autonomous driving mode for transporting goods or passengers, to a second autonomous driving mode for operating within a depot area, such as within the depot area 290 or 292. In this regard, the second autonomous driving mode may have a geofencing feature which prevents or prohibits the autonomous vehicle 100 from entering the second autonomous driving mode outside of a depot area. This second autonomous driving mode may enable the autonomous vehicle to address the one or more needs without accumulating errors (such as those that may be caused by the process of charging or sensor cleaning) or which automatically clears such errors once the one or more needs has been addressed. In addition, the geofencing feature may also avoid the need for the one or more additional authentication steps by human operators as described above.

The features described herein may enable autonomous vehicles to achieve certain driving behaviors within a depot area. In many instances, the features described herein may prevent an autonomous vehicle from becoming stuck if there is an obstacle in the way of reaching a particular stopping location in order to address some need of the autonomous vehicle 100 or the stopping is not actually available for some reason e.g., there is another vehicle stopped there or some object, such as a human, stopping the autonomous vehicle from entering the stopping location. This is because the autonomous vehicle 100 is provided with more flexibility to address such situations. This, in turn, may reduce the need for human operators who might otherwise be needed to enter the autonomous vehicle, change modes (e.g., from autonomous to manual), and control the autonomous vehicle to an appropriate location. In some instances, the features described herein may result in the autonomous vehicles driving to where one or more needs of the autonomous vehicle are most likely to be met (e.g., where certain amenities or human operators are available to address such needs). This may also reduce how much the human operators will have to move around in the depot, further saving resources and time. As such, the features described herein may reduce the need for human operators to be involved in the processes at depot areas and thus may reduce the workforce needed and overall operational costs to run a transportation service efficiently.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method comprising:
   receiving, by one or more processors of an autonomous vehicle, from a server computing device, a signal to control the autonomous vehicle to a depot area;
   identifying, by the one or more processors, a prioritized list of staging areas within the depot area, wherein:
     each staging area of the prioritized list of staging areas enables the autonomous vehicle to observe stopping locations at which a respective need of the autonomous vehicle may be addressed, and
     the prioritized list of staging areas is based on respective priorities associated with one or more needs of the autonomous vehicle;
   controlling, by the one or more processors, the autonomous vehicle to a first staging area of the prioritized list of staging areas corresponding to a first need of the one or more needs of the autonomous vehicle;
   once the autonomous vehicle has reached the first staging area, determining, by the one or more processors, whether a first stopping location associated with addressing the first need is available;
   responsive to determining that the first stopping location is available, controlling, by the one or more processors, the autonomous vehicle to the first stopping location; and
   responsive to determining that the first stopping location is not available, controlling, by the one or more processors, the autonomous vehicle to a second staging area of the prioritized list of staging areas corresponding to a second need of the one or more needs, wherein the second need is a lower priority than the first need.

2. The method of claim 1, wherein identifying the prioritized list of staging areas includes identifying the prioritized list of staging areas from a plurality of prioritized lists of staging areas based on the one or more needs.

3. The method of claim 1, wherein the prioritized list of staging areas is received from the server computing device.

4. The method of claim 1, wherein determining whether the first stopping location available includes observing, using one or more sensors of a perception system of the autonomous vehicle, one or more stopping locations proximate to the first staging area and associated with addressing the first need.

5. The method of claim 1, wherein the one or more needs includes charging the autonomous vehicle.

6. The method of claim 1, wherein the one or more needs includes sensor cleaning for the autonomous vehicle.

7. The method of claim 1, wherein the one or more needs includes internal or external cleaning of the autonomous vehicle.

8. The method of claim 1, further comprising, once the autonomous vehicle has reached the second staging area, determining, by the one or more processors, whether a second stopping location associated with addressing the second need is available.

9. The method of claim 8, further comprising:
   based on the determination of whether the second stopping location is available, identifying, by the one or more processors, a third staging area of the prioritized list of staging areas corresponding to a third need of the one or more needs, wherein the third need is a lower priority than the second need; and
   controlling, by the one or more processors, the autonomous vehicle to the third staging area.

10. The method of claim 1, further comprising:
    once the autonomous vehicle has reached the second staging area, determining, by the one or more processors, that a second stopping location associated with addressing the second need is available; and
    based on the determination that the second stopping location is available, controlling, by the one or more processors, the autonomous vehicle to the second stopping location.

11. The method of claim 10, further comprising, displaying, on a display of the autonomous vehicle, a notification identifying at least one of the one or more needs.

12. The method of claim 11, wherein the notification provides an instruction for a human operator to enable the autonomous vehicle to have the at least one of the one or more needs addressed.

13. A system comprising one or more processors of an autonomous vehicle configured to:
    receive, from a server computing device, a signal to control the autonomous vehicle to a depot area;
    identify a prioritized list of staging areas within the depot area, wherein:
      each staging area of the prioritized list of staging areas enables the autonomous vehicle to observe stopping locations at which a respective need of the autonomous vehicle may be addressed, and
      the prioritized list of staging areas is based on respective priorities associated with one or more needs of the autonomous vehicle;
    control the autonomous vehicle to a first staging area of the prioritized list of staging areas corresponding to a first need of the one or more needs of the autonomous vehicle;
    once the autonomous vehicle has reached the first staging area, determining whether a first stopping location associated with addressing the first need is available;

responsive to determining that the first stopping location is available, control the autonomous vehicle to the first stopping location; and responsive to determining that the first stopping location is not available, control the autonomous vehicle to a second staging area of the prioritized list of staging areas corresponding to a second need of the one or more needs, wherein the second need is a lower priority than the first need.

14. The system of claim 13, wherein the one or more processors are further configured to identify the prioritized list of staging areas by identifying the prioritized list of staging areas from a plurality of prioritized lists of staging areas based on the one or more needs.

15. The system of claim 13, wherein the prioritized list of staging areas is received from the server computing device.

16. The system of claim 13, wherein the one or more processors are further configured to, once the autonomous vehicle has reached the second staging area, determine whether a second stopping location associated with addressing the second need is available.

17. The system of claim 16, wherein the one or more processors are further configured to:

based on the determination of whether the second stopping location is available, identify a third staging area of the prioritized list of staging areas corresponding to a third need of the one or more needs, wherein the third need is a lower priority than the second need; and control the autonomous vehicle to the third staging area.

18. The system of claim 13, wherein the one or more processors are further configured to:

once the autonomous vehicle has reached the second staging area, determine that a second stopping location associated with addressing the second need is available; and based on the determination that the second stopping location is available, control the autonomous vehicle to the second stopping location.

19. The system of claim 13, wherein the one or more processors are further configured to display, on a display of the autonomous vehicle, a notification identifying at least one of the one or more needs.

20. The system of claim 13, further comprising the autonomous vehicle.

* * * * *